(12) United States Patent
Chen et al.

(10) Patent No.: US 12,555,019 B2
(45) Date of Patent: Feb. 17, 2026

(54) QUANTUM DEVICE AND MICROWAVE DEVICE

(71) Applicant: Industrial Technology Research Institute, Hsinchu (TW)

(72) Inventors: Chang-Sheng Chen, Taipei (TW); Che-Hao Li, Tainan (TW); Cheng-Hua Tsai, New Taipei (TW); Meng-Hsuan Chen, Taichung (TW); Wei Chaun Yu, New Taipei (TW); Meng-Sheng Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 608 days.

(21) Appl. No.: 18/088,807

(22) Filed: Dec. 27, 2022

(65) Prior Publication Data
US 2024/0346351 A1 Oct. 17, 2024

(30) Foreign Application Priority Data
Dec. 8, 2022 (TW) .................................. 111147188

(51) Int. Cl.
*G06N 10/40* (2022.01)
*H05K 1/14* (2006.01)

(52) U.S. Cl.
CPC ............. *G06N 10/40* (2022.01); *H05K 1/147* (2013.01)

(58) Field of Classification Search
CPC ........ G06N 10/00; G06N 10/20; G06N 10/40; G06N 10/60; G06N 10/70; G06N 10/80;
(Continued)

(56) References Cited

U.S. PATENT DOCUMENTS 7,932,515 B2 4/2011 Bunyk
8,315,678 B2 11/2012 Uchaykin
(Continued)

FOREIGN PATENT DOCUMENTS

CN 113421961 9/2021
CN 113475168 10/2021
(Continued)

OTHER PUBLICATIONS

Stefano Pellerano et al., "Cryogenic CMOS for Qubit Control and Readout", 2022 IEEE Custom Integrated Circuits Conference (CICC), Apr. 24, 2022, pp. 1-8.
(Continued)

*Primary Examiner* — Paul Dinh
(74) *Attorney, Agent, or Firm* — JCIPRNET

(57) ABSTRACT

The disclosure provides a quantum device and a microwave device. The quantum device includes a first partition, a second partition, an upper circuit board, a lower circuit board and a flexible circuit. The second partition is arranged below the first partition. The first partition and the second partition are used to define an ultra-low temperature chamber of the quantum device. The upper circuit board, the lower circuit board and the flexible circuit are arranged in the ultra-low temperature chamber. The upper circuit board is disposed on a lower surface of the first partition. The lower circuit board is disposed on an upper surface of the second partition. The flexible circuit is electrically connected between the upper circuit board and the lower circuit board to provide multiple signal paths for mutual signal transmission between the upper circuit board and the lower circuit board.

29 Claims, 19 Drawing Sheets

(58) Field of Classification Search
CPC .......... H05K 1/147; H05K 1/18; H05K 1/148; H05K 1/189
USPC .......................................................... 716/100
See application file for complete search history.

(56) References Cited

U.S. PATENT DOCUMENTS

| | | | |
|---|---|---|---|
| 9,647,194 | B1 | 5/2017 | Dotsenko |
| 2016/0364653 | A1 | 12/2016 | Chow et al. |
| 2018/0013052 | A1 | 1/2018 | Oliver et al. |
| 2020/0034736 | A1 | 1/2020 | Mueller et al. |
| 2022/0190135 | A1 | 6/2022 | Kotlyar et al. |
| 2023/0359920 | A1* | 11/2023 | Luo ........................ G06N 10/40 |

FOREIGN PATENT DOCUMENTS

| | | |
|---|---|---|
| CN | 114051318 | 2/2022 |
| TW | 201814902 | 4/2018 |
| TW | I742129 | 10/2021 |
| TW | 202224369 | 6/2022 |
| WO | 2013126120 | 8/2013 |
| WO | 2022060897 | 3/2022 |

OTHER PUBLICATIONS

Marco Fellous-Asiani et al., "Optimizing resource efficiencies for scalable full-stack quantum computers", retrieved from arXiv database, arXiv:2209.05469v2 [quant-ph], Nov. 13, 2022, pp. 1-40.

Ian Conway Lamb, "Cryogenic Control Beyond 100 Qubits", Master of Science in Physics Thesis, School of Physics, The University of Sydney, Dec. 31, 2016, pp. 1-103.

"Partial Search Report of Europe Counterpart Application", issued on Nov. 7, 2023, p. 1-p. 15.

"Office Action of Taiwan Counterpart Application", issued on Oct. 11, 2023, p. 1-p. 5.

O. Naaman et al., "Josephson junction microwave modulators for qubit control", Journal of Applied Physics, vol. 121, No. 7, Feb. 21, 2017, pp. 1-7.

"Search Report of Europe Counterpart Application", issued on Feb. 5, 2024, p. 1-p. 15.

B. Aja et al., "Cryogenic Low-Noise mHEMT-Based MMIC Amplifiers for 4-12 GHz Band", IEEE Microwave and Wireless Components Letters, vol. 21, Issue 11, Nov. 2011, pp. 613-615.

Ahmed Halid Akgiray, "New Technologies Driving Decade-Bandwidth Radio Astronomy: Quad-Ridged Flared Horn & Compound-Semiconductor LNAs", Thesis of Doctor Degree, California Institute of Technology, Apr. 2013, pp. 1-182.

Eunjung Cha et al., "0.3-14 and 16-28 GHz Wide-Bandwidth Cryogenic MMIC Low-Noise Amplifiers", IEEE Transactions on Microwave Theory and Techniques, vol. 66, Issue 11, Nov. 2018, pp. 1860-4869.

Jie Liu et al., "Cryogenic Modeling of GaAs-pHEMT and its Application in Low-power MMIC CLNA Design for Radio Astronomy", 2019 IEEE Asia-Pacific Microwave Conference (APMC), Dec. 2019, pp. 1366-1368.

Eunjung Cha et al., "A 300-μW Cryogenic HEMT LNA for Quantum Computing", 2020 IEEE/MTT-S International Microwave Symposium, Aug. 2020, pp. 1299-1302.

Felix Heinz et al., "A 50-nm Gate-Length Metamorphic HEMT Technology Optimized for Cryogenic Ultra-Low-Noise Operation", IEEE Transactions on Microwave Theory and Techniques, vol. 69, Issue 8, Aug. 2021, pp. 3896-3907.

Bishnu Patra et al., "A Scalable Cryo-CMOS 2-to-20GHz Digitally Intensive Controller for 4×32 Frequency Multiplexed Spin Qubits/Transmons in 22nm FinFET Technology for Quantum Computers", 2020 IEEE International Solid-State Circuits Conference, Feb. 2020, pp. 304-306.

Joseph C. Bardin et al., "Design and Characterization of a 28-nm Bulk-CMOS Cryogenic Quantum Controller Dissipating Less Than 2 mW at 3 K", IEEE Journal of Solid-State Circuits, vol. 54, Issue 11, Nov. 2019, pp. 3043-3060.

Joseph C. Bardin et al., "A 28nm Bulk-CMOS 4-to-8GHz <2mW Cryogenic Pulse Modulator for Scalable Quantum Computing", 2019 IEEE International Solid-State Circuits Conference, Feb. 2019, pp. 456-458.

\* cited by examiner

QUANTUM DEVICE AND MICROWAVE DEVICE

CROSS-REFERENCE TO RELATED APPLICATION

This application claims the priority benefit of Taiwan application serial no. 111147188, filed on Dec. 8, 2022. The entirety of the above-mentioned patent application is hereby incorporated by reference herein and made a part of this specification.

TECHNICAL FIELD

The present disclosure relates to a computing device, and more particularly to a quantum device and a microwave device.

BACKGROUND

Generally speaking, a superconducting quantum bit is set in a bottom ultra-low temperature chamber (temperature is about 10 mK) of a freezer. In order to reduce the number of signal paths between a control device in the room-temperature environment and the quantum bit in the ultra-low temperature chamber, a driver circuit (such as control circuit, write circuit and/or read circuit) used to drive the quantum bit is expected to be set in an ultra-low temperature environment (temperature can be 1~100K). Typically, the ultra-low temperature chamber where the driver circuit is located is different from the bottom ultra-low temperature chamber where the quantum bit is located.

Since the quantum bit is in the bottom space of the vertically suspended freezer, the electrical connection wire for the quantum bit is disposed in an up-down direction, so the layout of the printed circuit board (driver circuit) placed in the freezer is also arranged in a vertical manner. The upper boundary and the lower boundary of the printed circuit board are respectively locked on the lower surface of an upper partition and the upper surface of a lower partition of the ultra-low temperature chamber. The printed circuit board (driver circuit) may be electrically coupled to the quantum bit portion located at the bottom ultra-low temperature chamber through the lower partition. The printed circuit board (driver circuit) may be electrically coupled to an electrical path of the low-temperature chamber located on the upper space and/or a control device located in the room-temperature environment through the upper partition.

In the process of reducing temperature significantly, the printed circuit board locked between the upper partition and the lower partition is prone to connection breakage and damage due to shrinkage. How to arrange the driver circuit (such as control circuit, write circuit and/or read circuit) for driving quantum bit in the ultra-low temperature chamber is one of many technical issues in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The present disclosure provides a quantum device and a microwave device, which are provided to arrange a microwave device (such as a control circuit, a write circuit and/or a read circuit) for driving a quantum bit in an ultra-low temperature chamber.

In an embodiment of the disclosure, the quantum device includes a first partition, a second partition, a first upper circuit board, a first lower circuit board, and a first flexible circuit. The second partition is arranged below the first partition. The first partition and the second partition are configured to define a first ultra-low temperature chamber of the quantum device. The first upper circuit board, the first lower circuit board, and the first flexible circuit are arranged in the first ultra-low temperature chamber. The first upper circuit board is disposed on a lower surface of the first partition. The first lower circuit board is disposed on an upper surface of the second partition. The first flexible circuit is electrically connected between the first upper circuit board and the first lower circuit board to provide multiple signal paths for mutual signal transmission between the first upper circuit board and the first lower circuit board.

In an embodiment of the present disclosure, the above-mentioned microwave device includes a microwave circuit and an attenuator. The first end of the attenuator is coupled to the microwave circuit. The second end of the attenuator is coupled to the quantum bit portion.

Based on the above, the quantum device described in the embodiments of the present disclosure divides the circuit board used to realize the microwave device into two pieces (the upper circuit board and the lower circuit board). The upper circuit board and the lower circuit board are electrically connected to each other through flexible circuits (such as flex cables, flexible printed circuit boards or other flexible electrical paths). Therefore, in the process of reducing temperature significantly, the flexible circuit may provide a deformation and buffering effect when the upper circuit board and the lower circuit board are shrunk, so as to prevent the connection from being broken and damaged.

In order to make the above-mentioned features and advantages of the present disclosure more comprehensible, the specific examples below are described in detail in conjunction with the accompanying drawings.

DETAILED DESCRIPTION OF DISCLOSED EMBODIMENTS

Figure 1:
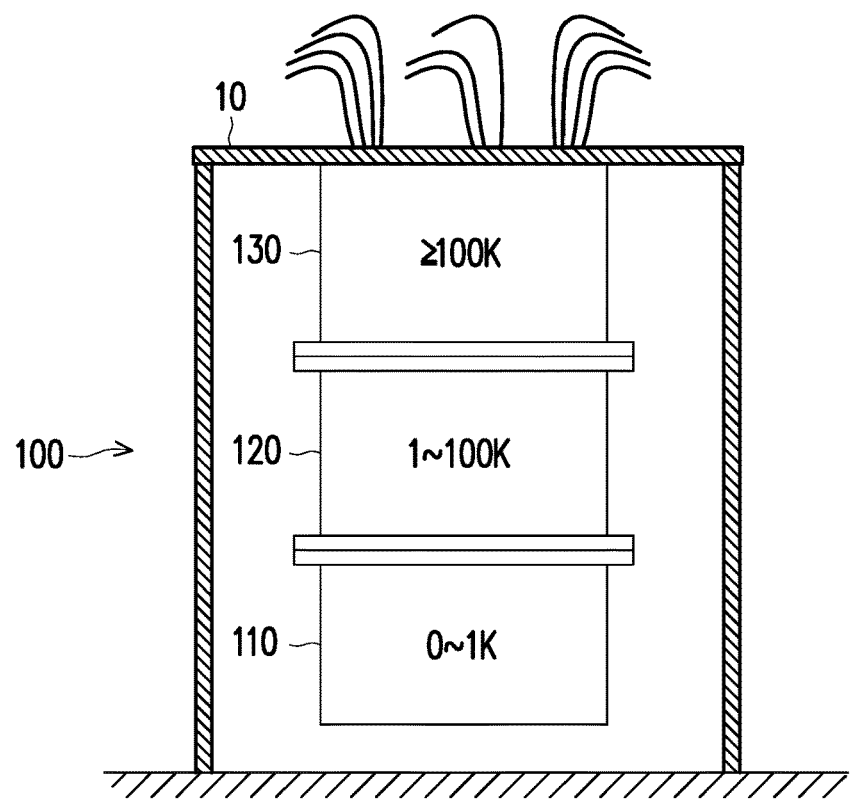
FIG. 1 is a schematic diagram of a quantum device according to an embodiment of the present disclosure.

The term "couple (or connect)" used throughout the specification (including the claims) may refer to any direct or indirect connection means. For example, when it is described in the specification that the first device is coupled (or connected) to the second device, it should be interpreted as that the first device may be directly connected to the second device, or the first device may be indirectly connected to the second device through another device or a certain connection means. The terms "first," "second," etc. in the specification (including the claims) are used to name the elements, or to distinguish different embodiments or ranges from each other, and are not used to limit the upper or lower limit of the number of elements nor the order of the elements. In addition, wherever possible, elements/components/steps that use same reference numerals in drawings and implementing methods represent same or similar parts. Cross-reference may be made to related descriptions of elements/members/steps with the same reference numerals or the same terms in different embodiments.

FIG. 1 is a schematic diagram of a quantum device 100 according to an embodiment of the present disclosure. The freezer of the quantum device 100 is vertically suspended under a high stand 10. In the embodiment shown in FIG. 1, the freezer of the quantum device 100 includes an ultra-low temperature chamber 110, an ultra-low temperature chamber 120 and a low-temperature chamber 130. The internal temperature of the ultra-low temperature chamber 110 falls within the range of 0K to 1K, the internal temperature of the ultra-low temperature chamber 120 falls within the range of 1K to 100K, and the internal temperature of the low-temperature chamber 130 is greater than or equal to 100K. It should be noted that the number of chambers of the quantum device 100 and the internal temperature of each chamber may be determined according to the actual design, and are not limited to the exemplary description of FIG. 1.

Figure 2:
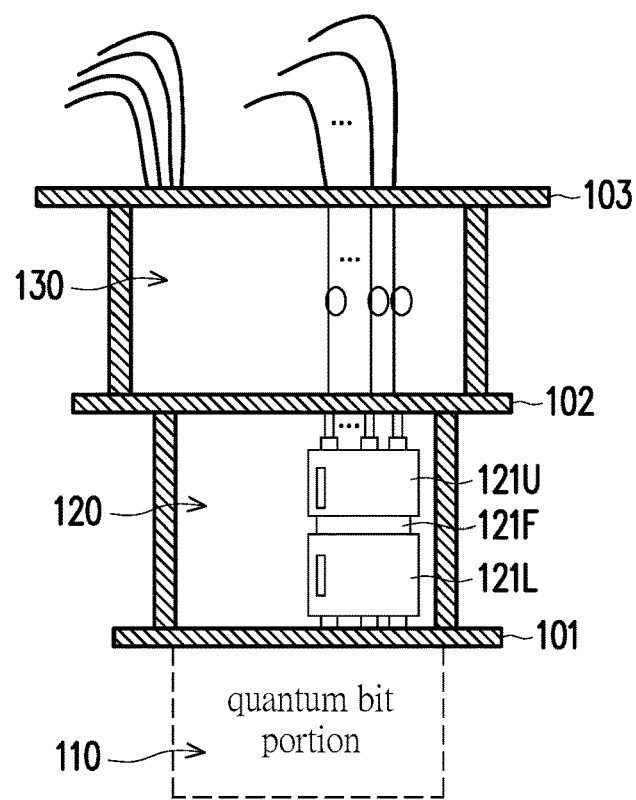
FIG. 2 is a schematic diagram of different chambers in a freezer according to an embodiment of the present disclosure.

FIG. 2 is a schematic diagram of different chambers in the freezer according to an embodiment of the present disclosure. In order to see through the interior of the chamber, FIG. 2 does not show the outer housing of the freezer. The freezer of the quantum device 100 includes a partition 101, a partition 102, a partition 103, an upper circuit board 121U, a lower circuit board 121L, and a flexible circuit 121F. The partition 102 is disposed below the partition 103. The partition 102 and the partition 103 are configured to define the low-temperature chamber 130 of the quantum device 100. The partition 101 is disposed below the partition 102. The partition 101 and the partition 102 are disposed to define the ultra-low temperature chamber 120 of the quantum device 100. The upper circuit board 121U, the lower circuit board 121L, and the flexible circuit 121F are disposed in the ultra-low temperature chamber 120. For the ultra-low temperature chamber 110, the ultra-low temperature chamber 120, and the low-temperature chamber 130 of the freezer shown in FIG. 2, reference may be made to the relevant descriptions of the ultra-low temperature chamber 110, the ultra-low temperature chamber 120, and the low-temperature chamber 130 shown in FIG. 1.

Please refer to FIG. 2, the superconducting quantum bit is set in the ultra-low temperature chamber 110. A driver circuit (microwave device, such as a control circuit, a write circuit and/or a read circuit) for driving the quantum bit is disposed in the ultra-low temperature chamber 120. For example, the microwave device for driving quantum bits may be disposed on the upper circuit board 121U and the lower circuit board 121L. The microwave device may access the quantum bit portion disposed in the ultra-low temperature chamber 110 through the partition 101.

Since the quantum bit is set in the lowermost space of the freezer, the electrical connection wires for the quantum bit are arranged in an up-down direction. Therefore, the printed circuit board (driver circuit, such as the upper circuit board 121U and the lower circuit board 121L shown in FIG. 2) placed in the ultra-low temperature chamber 120 are also placed vertically. The upper edge portion of the upper circuit board 121U is disposed (for example locked) on the lower surface of the partition 102. The upper circuit board 121U may be electrically coupled to an electrical path in the low-temperature chamber 130 and/or a control device (not shown) in a room-temperature environment through the partition 102. The lower edge portion of the lower circuit board 121L is disposed (for example, locked) on the upper surface of the partition 101. The lower circuit board 121L may be electrically coupled to the quantum bit portion located in the ultra-low temperature chamber 110 through the partition 101. The flexible circuit 121F is electrically connected between the upper circuit board 121U and the lower circuit board 121L. The flexible circuit 121F may provide multiple signal paths for the upper circuit board 121U and the lower circuit board 121L to transmit signals to each other.

According to the actual design, in some embodiments, the flexible circuit 121F may include a flexible cable or a flexible printed circuit board (FPC), and the upper circuit board 121U may include a rigid printed circuit board (PCB), while the lower circuit board 121L may include another rigid PCB. During the process of reducing temperature significantly, the distance between the upper circuit board 121U and the lower circuit board 121L increases because the upper circuit board 121U locked on the partition 102 and the lower circuit board 121L locked on the partition 101 are shrunk. In the process of reducing temperature significantly, the flexible circuit 121F may provide a deformation and buffering effect when the upper circuit board 121U and the lower circuit board 121L are shrunk, so as to prevent the connection from breaking and being damaged.

Figure 3:
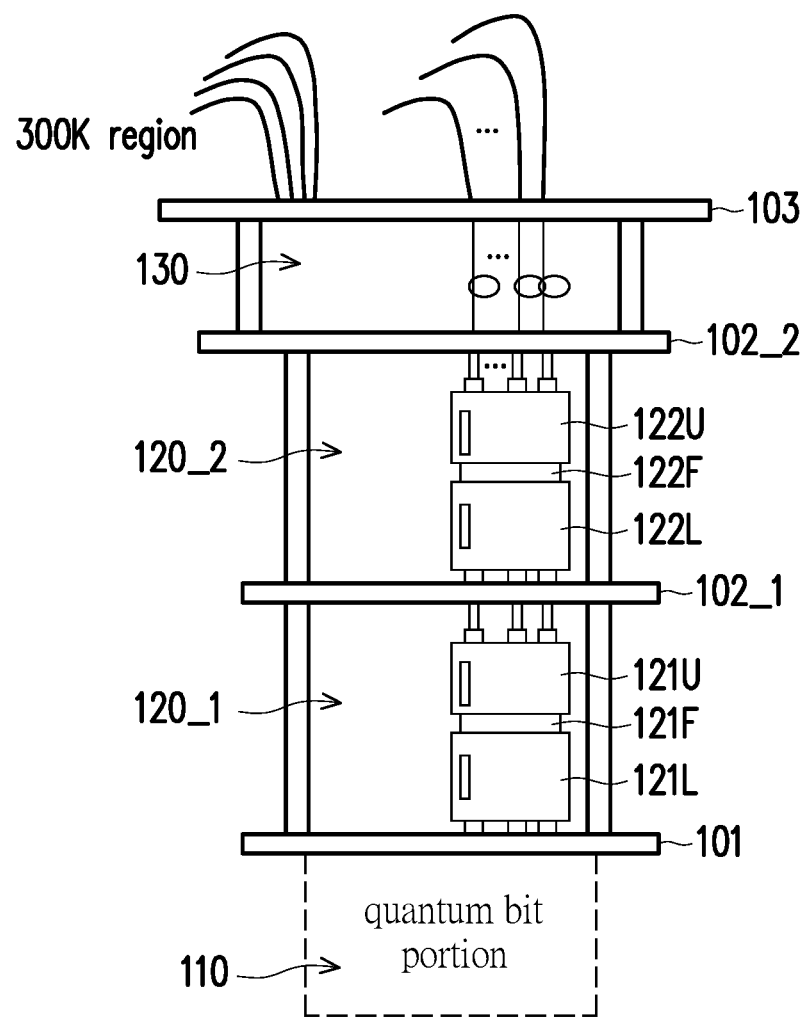
FIG. 3 is a schematic diagram of different chambers in the freezer according to another embodiment of the present disclosure.

FIG. 3 is a schematic diagram of different chambers in the freezer according to another embodiment of the present disclosure. In order to see through the interior of the chamber, FIG. 3 does not show the outer housing of the freezer. The freezer of the quantum device 100 includes a partition 101, a partition 102_1, a partition 102_2, a partition 103, an upper circuit board 121U, a lower circuit board 121L, a flexible circuit 121F, an upper circuit board 122U, a lower circuit board 122L, and a flexible circuit 122F. The partition 102_2 is disposed under the partition 103. The partition 102_2 and the partition 103 are disposed to define the low-temperature chamber 130 of the quantum device 100. The internal temperature of the low-temperature chamber 130 is greater than or equal to 100K. The partition 102_1 is disposed under the partition 102_2. The partitions 102_1 and 102_2 are disposed to define the ultra-low temperature chamber 120_2 of the quantum device 100. The internal temperature of the ultra-low temperature chamber 120_2 falls within a range of 10K to 100K. The upper circuit board 122U, the lower circuit board 122L, and the flexible circuit 122F are disposed in the ultra-low temperature chamber 120_2. The partition 101 is disposed under the partition 102_1. The partition 101 and the partition 102_1 are disposed to define the ultra-low temperature chamber 120_1 of the quantum device 100. The internal temperature of the ultra-low temperature chamber 120_1 falls within a range of 1K to 10K. The upper circuit board 121U, the lower circuit board 121L, and the flexible circuit 121F are disposed in the ultra-low temperature chamber 120_1.

For the ultra-low temperature chamber 110 and the low-temperature chamber 130 of the freezer shown in FIG. 3, reference may be made to the relevant description of the ultra-low temperature chamber 110 and the low-temperature chamber 130 shown in FIG. 1. For the ultra-low temperature chamber 120_1 and the ultra-low temperature chamber 120_2 shown in FIG. 3, reference may be made to the relevant description of the ultra-low temperature chamber 120 shown in FIG. 2 and analogies may be made accordingly. For the upper circuit board 121U, the lower circuit board 121L, and the flexible circuit 121F shown in FIG. 3, reference may be made to the relevant description of the upper circuit board 121U, the lower circuit board 121L, and the flexible circuit 121F shown in FIG. 2 and analogies may be made accordingly.

In the embodiment shown in FIG. 3, the upper circuit board 122U is locked on the lower surface of the partition 102_2, the lower circuit board 122L is locked on the upper surface of the partition 102_1, the upper circuit board 121U is locked on the lower surface of the partition 102_1, and the lower circuit board 121L is locked on the upper surface of the partition 101. The upper circuit board 122U may be electrically coupled to an electrical path in the low-temperature chamber 130 and/or a control device (not shown) in a room-temperature environment through the partition 102_2. The flexible circuit 122F is electrically connected between the upper circuit board 122U and the lower circuit board 122L to provide multiple signal paths for the upper circuit board 122U and the lower circuit board 122L to transmit signals to each other. For the upper circuit board 122U, the lower circuit board 122L, and the flexible circuit 122F, reference may be made to the related descriptions of the upper circuit board 121U, the lower circuit board 121L, and the flexible circuit 121F, and analogies may be made accordingly, so the details are not repeated here. The upper circuit board 121U may be electrically coupled to the lower circuit board 122L through the partition 102_1.

Figure 4:
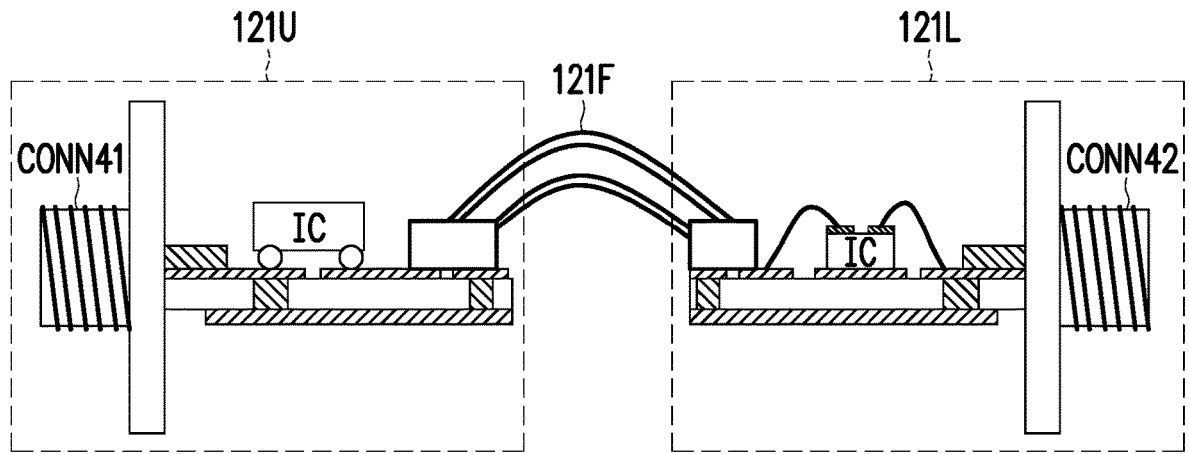
FIG. 4 is a schematic side view of an upper circuit board, a lower circuit board and a flexible circuit according to an embodiment of the present disclosure.

FIG. 4 is a schematic side view of the upper circuit board 121U, the lower circuit board 121L, and the flexible circuit 121F according to an embodiment of the present disclosure. In the embodiment shown in FIG. 4, the flexible circuit 121F may be a flex cable or a flexible printed circuit board (FPCB), the upper circuit board 121U may include a rigid PCB, and the lower circuit board 121L may include another rigid PCB. Please refer to FIG. 2 and FIG. 4. The first edge portion of the flexible circuit 121F is electrically connected to the edge portion of the upper circuit board 121U. The second edge portion of the flexible circuit 121F is electrically connected to the edge portion of the lower circuit board 121L. The flexible circuit 121F may provide multiple signal paths for the upper circuit board 121U and the lower circuit board 121L to transmit signals to each other. A connector CONN41 of the upper circuit board 121U is locked on the lower surface of the partition 102. A connector CONN42 of the lower circuit board 121L is locked on the upper surface of the partition 101.

Figure 5:
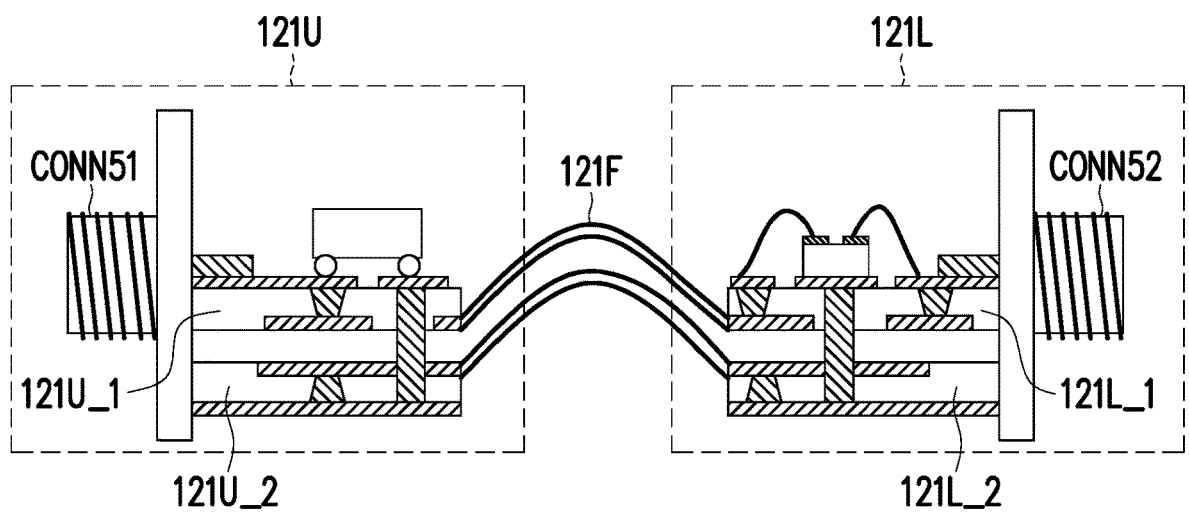
FIG. 5 is a schematic side view of an upper circuit board, a lower circuit board and a flexible circuit according to another embodiment of the present disclosure.

FIG. 5 is a schematic side view of the upper circuit board 121U, the lower circuit board 121L, and the flexible circuit 121F according to another embodiment of the present disclosure. In the embodiment shown in FIG. 5, the flexible circuit 121F may be a flexible printed circuit board (FPCB), the upper circuit board 121U may include a rigid PCB, and the lower circuit board 121L may include another rigid PCB. Please refer to FIG. 2 and FIG. 5. The first edge portion of the flexible circuit 121F is embedded between the first layer 121U_1 and the second layer 121U_2 of the upper circuit board 121U. The second edge portion of the flexible circuit 121F is embedded between the first layer 121L_1 and the second layer 121L_2 of the lower circuit board 121L. The flexible circuit 121F may provide multiple signal paths for the upper circuit board 121U and the lower circuit board 121L to transmit signals to each other. A connector CONN51 of the upper circuit board 121U is locked on the lower surface of the partition 102. A connector CONN52 of the lower circuit board 121L is locked on the upper surface of the partition 101.

Figure 6:
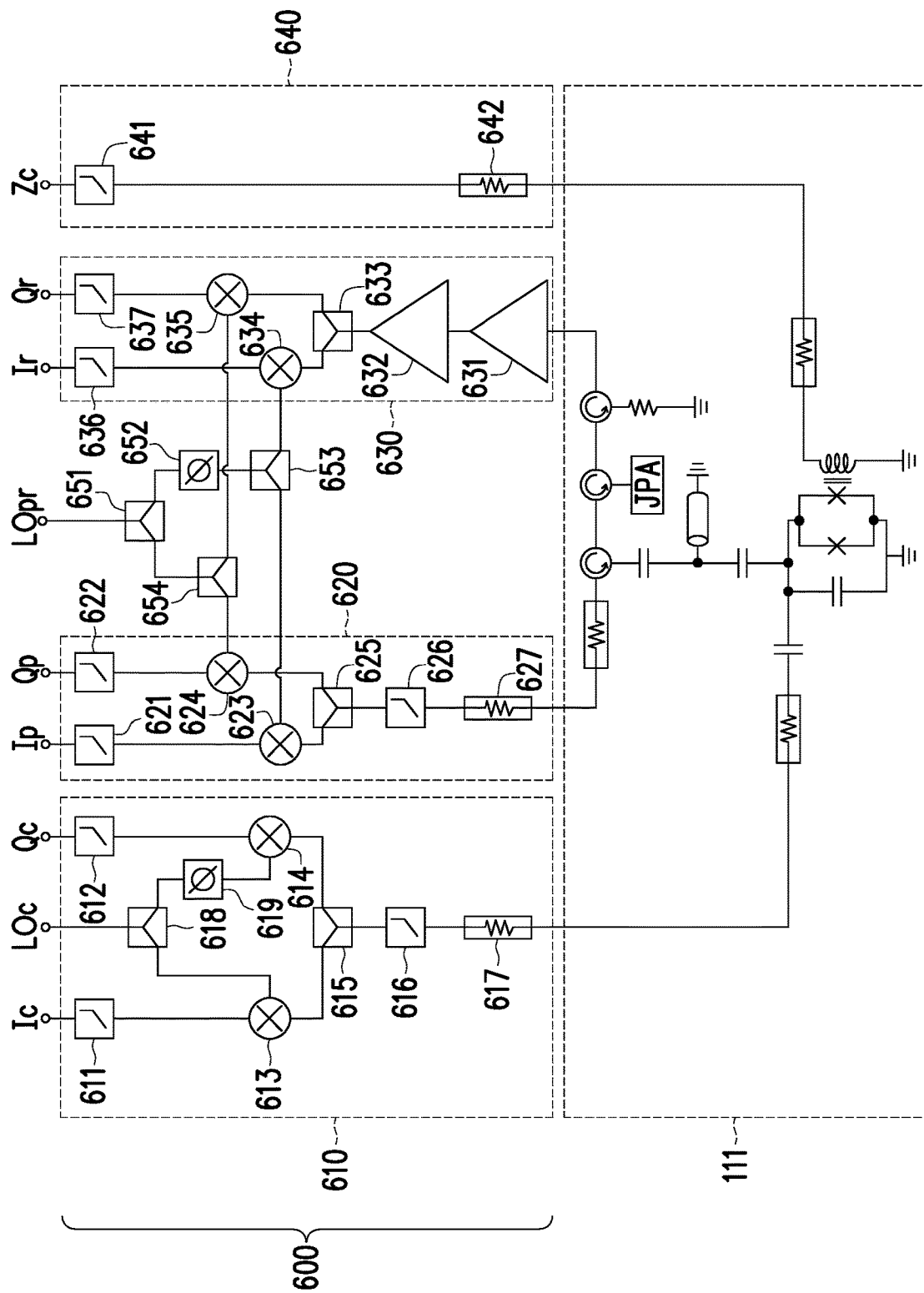
FIG. 6 is a circuit block diagram of a microwave device according to an embodiment of the present disclosure.

FIG. 6 is a circuit block diagram of a microwave device 600 according to an embodiment of the present disclosure. The microwave device 600 shown in FIG. 6 is disposed on the upper circuit board 121U and the lower circuit board 121L shown in FIG. 2. The microwave device 600 is disposed to drive the quantum bit portion 111 disposed in the ultra-low temperature chamber 110. The quantum bit portion 111 may include any quantum processor circuit, such as a commonly known superconducting quantum bit or other quantum processor circuits.

In the embodiment shown in FIG. 6, the microwave device 600 includes a control circuit 610, a write circuit 620, a read circuit 630, and a control circuit 640. The control circuit 610 and the control circuit 640 may control the quantum bit portion 111. For example, the control circuit 610 may perform XY-control on the quantum bit portion 111 based on the control signals (I-phase control signal Ic and Q-phase control signal Qc), and the control circuit 640 may perform Z-control on the quantum bit portion 111 based on the control signal Zc. The write circuit 620 may write data (I-phase data Ip and Q-phase data Qp) into the quantum bit portion 111. The read circuit 630 may read data (I-phase data Ir and Q-phase data Qr) from the quantum bit portion 111.

Please refer to FIG. 2 and FIG. 6. The control circuit 640 includes a filter 641 and an attenuator 642. The filter 641 may be a low-pass filter or other filters. The input terminal of the filter 641 is configured to receive the control signal Zc. The input terminal of the attenuator 642 is coupled to the output terminal of the filter 641. The output terminal of the attenuator 642 is coupled to the quantum bit portion 111 through the partition 101.

The control circuit 610 includes a microwave circuit (such as a filter 611, a filter 612, a mixer 613, a mixer 614, a switching circuit 615, a filter 616, a switching circuit 618, and a phase shift circuit 619) and an attenuator 617. The input terminal of the filter 611 is disposed to receive the I-phase control signal Ic. The input terminal of the filter 612 is disposed to receive the Q-phase control signal Qc. The filter 611 and the filter 612 may be low-pass filters or other filters.

The first input terminal of the mixer 613 is coupled to the output terminal of the filter 611. The second input terminal of the mixer 613 receives a first oscillation clock. The common terminal of the switching circuit 618 is disposed to receive a local oscillation clock LOc. The first selection terminal of the switching circuit 618 is coupled to the second input terminal of the mixer 613 to provide the first oscillation clock. A first input terminal of the mixer 614 is coupled to an output terminal of the filter 612. The second input terminal of the mixer 614 receives a second oscillation clock. The input terminal of the phase shift circuit 619 is coupled to a second selection terminal of the switching circuit 618. The output terminal of the phase shift circuit 619 is coupled to the second input terminal of the mixer 614 to provide the second oscillation clock. The first selection terminal of the switching circuit 615 is coupled to the output terminal of the mixer 613. The second selection terminal of the switching circuit 615 is coupled to the output terminal of the mixer 614. The filter 616 may be a low-pass filter or other filters. The input terminal of the filter 616 is coupled to the common terminal of the switching circuit 615. The input terminal of the attenuator 617 is coupled to the output terminal of the filter 616. The output terminal of the attenuator 617 is coupled to the quantum bit portion 111 through the partition 101.

Figure 7:
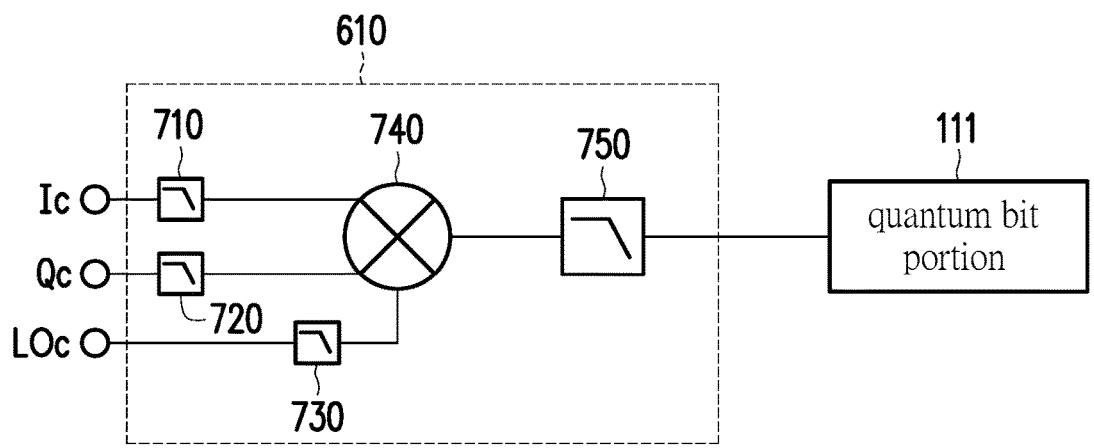
FIG. 7 is a circuit block diagram of a control circuit according to another embodiment of the present disclosure.

FIG. 7 is a circuit block diagram of a control circuit 610 according to another embodiment of the present disclosure. The control circuit 610 shown in FIG. 7 includes a filter 710, a filter 720, a filter 730, a mixer 740, and a filter 750. The filter 710, the filter 720, the filter 730, and the filter 750 may be low-pass filters or other filters. The input terminal of the filter 710 is disposed to receive the I-phase control signal Ic. The input terminal of the filter 720 is disposed to receive the Q-phase control signal Qc. The input terminal of the filter 730 is disposed to receive the local oscillation clock LOc. The mixer 740 is coupled to the output terminal of the filter 710, the output terminal of the filter 720, and the output terminal of the filter 730. The input terminal of the filter 750 is coupled to the output terminal of the mixer 740. The output terminal of the filter 750 is coupled to the quantum bit portion 111 through the partition 101.

Please refer to FIG. 2 and FIG. 6. The write circuit 620 includes a microwave circuit (for example, a filter 621, a filter 622, a mixer 623, a mixer 624, a switching circuit 625, and a filter 626) and an attenuator 627. The filter 621, the filter 622, and the filter 626 may be low-pass filters or other filters. The input terminal of the filter 621 is disposed to receive the I-phase data Ip. The input terminal of the filter 622 is disposed to receive the Q-phase data Qp. The first input terminal of the mixer 623 is coupled to the output terminal of the filter 621. The second input terminal of the mixer 623 receives the first oscillation clock. The first input terminal of the mixer 624 is coupled to the output terminal of the filter 622. The second input terminal of the mixer 624 receives the second oscillation clock. The first selection terminal of the switching circuit 625 is coupled to the output terminal of the mixer 623. The second selection terminal of the switching circuit 625 is coupled to the output terminal of the mixer 624. The input terminal of the filter 626 is coupled to the common terminal of the switching circuit 625. The input terminal of the attenuator 627 is coupled to the output terminal of the filter 626. The output terminal of the attenuator 627 is coupled to the quantum bit portion 111 through the partition 101.

The read circuit 630 includes an amplifier 631, an amplifier 632, a switching circuit 633, a mixer 634, a mixer 635, a filter 636, and a filter 637. The filter 636 and the filter 637 may be low-pass filters or other filters. According to actual design, the amplifier 631 may include an ultra low power (ULP) low noise amplifier (LNA) or other amplifiers. The input terminal of the amplifier 631 is coupled to the quantum bit portion 111 through the partition 101. The input terminal of the amplifier 632 is coupled to the output terminal of the amplifier 631. According to actual design, the amplifier 632 may include a gain low noise amplifier (gain LNA) or other amplifiers. The common terminal of the switching circuit 633 is coupled to the output terminal of the amplifier 632. The first input terminal of the mixer 634 is coupled to the first selection terminal of the switching circuit 633. The second input terminal of the mixer 634 receives the third oscillation clock. The first input terminal of the mixer 635 is coupled to the second selection terminal of the switching circuit 633. The second input terminal of the mixer 635 receives the fourth oscillation clock. The input terminal of the filter 636 is coupled to the output terminal of the mixer 634. The output terminal of the filter 636 outputs the I-phase data Ir. The input terminal of the filter 637 is coupled to the output terminal of the mixer 635. The output terminal of the filter 637 outputs the Q-phase data Qr.

The microwave device shown in FIG. 6 further includes a switching circuit 651, a phase shift circuit 652, a switching circuit 653, and a switching circuit 654. The common terminal of the switching circuit 651 is disposed to receive the local oscillation clock LOpr. The input terminal of the phase shift circuit 652 is coupled to the first selection terminal of the switching circuit 651. The common terminal of the switching circuit 653 is coupled to the output terminal of the phase shift circuit 652. The first selection terminal of the switching circuit 653 is coupled to the write circuit 620 to provide the first oscillation clock. The second selection terminal of the switching circuit 653 is coupled to the read circuit 630 to provide the third oscillation clock. The common terminal of the switching circuit 654 is coupled to the second selection terminal of the switching circuit 651. The first selection terminal of the switching circuit 654 is coupled to the write circuit 620 to provide the second oscillation clock. The second selection terminal of the switching circuit 654 is coupled to the read circuit 630 to provide the fourth oscillation clock.

Figure 8:
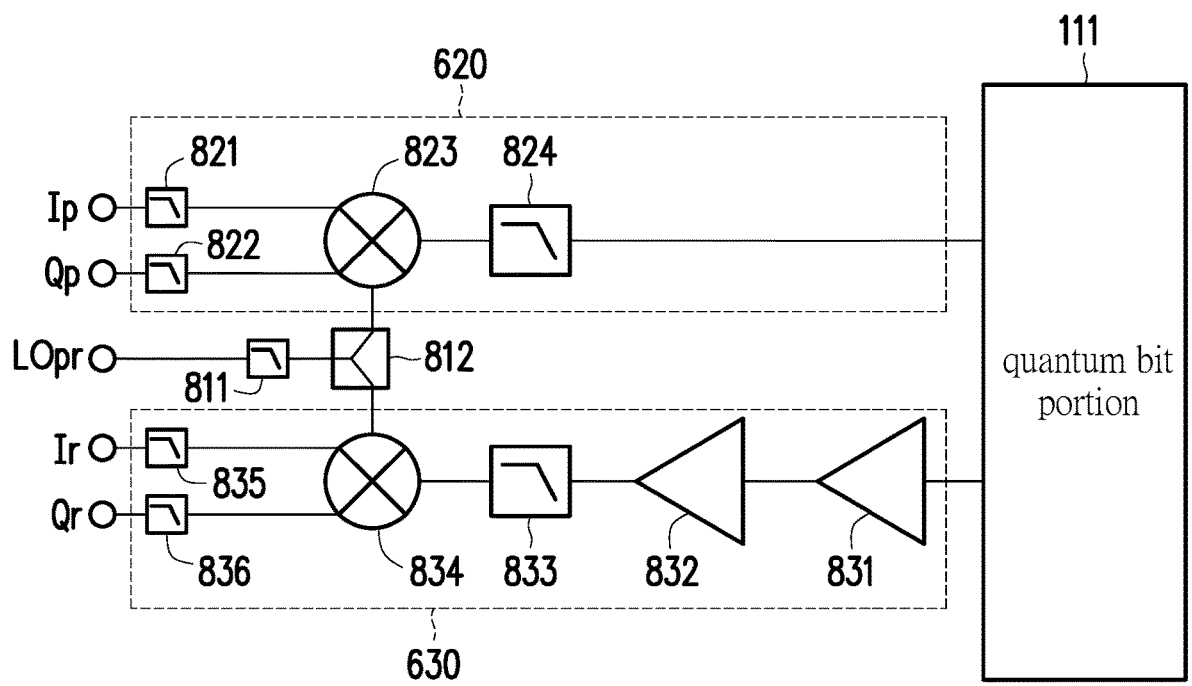
FIG. 8 is a circuit block diagram of a write circuit and a read circuit according to another embodiment of the present disclosure.

FIG. 8 is a circuit block diagram of a write circuit 620 and a read circuit 630 according to another embodiment of the present disclosure. The write circuit 620 shown in FIG. 8 includes a filter 821, a filter 822, a mixer 823, and a filter 824. The filter 821, the filter 822, and the filter 824 may be low-pass filters or other filters. The input terminal of the filter 821 is disposed to receive the I-phase data Ip. The input terminal of the filter 822 is disposed to receive the Q-phase control data Qp. The first input terminal of the mixer 823 is coupled to the output terminal of the filter 821. The second input terminal of the mixer 823 is coupled to the output terminal of the filter 822. The third input terminal of the mixer 823 receives the oscillation clock. The input terminal of the filter 824 is coupled to the output terminal of the mixer 823. The output terminal of the filter 824 is coupled to the quantum bit portion 111 through the partition 101.

The read circuit 630 shown in FIG. 8 includes an amplifier 831, an amplifier 832, a filter 833, a mixer 834, a filter 835, and a filter 836. The filter 835 and the filter 836 may be low-pass filters or other filters. According to actual design, the amplifier 831 may include an ULP LNA or other amplifiers. The input terminal of the amplifier 831 is coupled to the quantum bit portion 111 through the partition 101. The input terminal of the amplifier 832 is coupled to the output terminal of the amplifier 831. According to actual design, the amplifier 832 may include a gain LNA or other amplifiers. The input terminal of the filter 833 is coupled to the output terminal of the amplifier 832. The first input terminal of the mixer 834 is coupled to the output terminal of the filter 833. The second input terminal of the mixer 834 receives the oscillation clock. The input terminal of the filter 835 is coupled to the first output terminal of the mixer 834. The input terminal of the filter 836 is coupled to the second output terminal of the mixer 834.

The microwave device shown in FIG. 8 further includes a filter 811 and a switching circuit 812. The input terminal of the filter 811 is disposed to receive the local oscillation clock LOpr. The common terminal of the switching circuit 812 is coupled to the output terminal of the filter 811. The first selection terminal of the switching circuit 812 is coupled to the write circuit 620 to provide the oscillation clock. The second selection terminal of the switching circuit 812 is coupled to the read circuit 630 to provide the oscillation clock.

Figure 9:
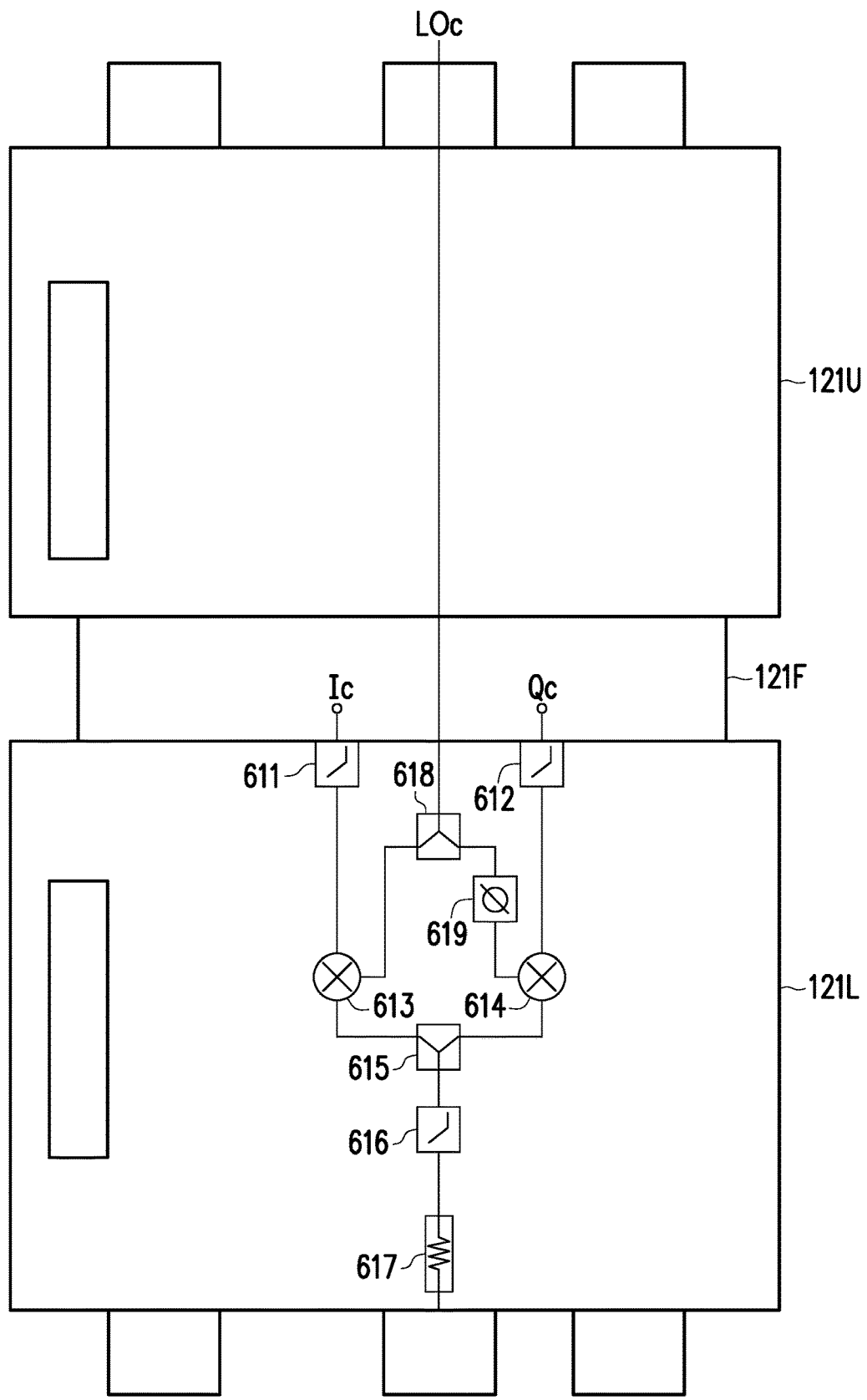
FIG. 9 is a schematic diagram of component placement on the upper circuit board and the lower circuit board according to an embodiment of the present disclosure.

FIG. 9 is a schematic diagram of component placement on the upper circuit board 121U and the lower circuit board 121L according to an embodiment of the present disclosure. FIG. 9 illustrates the control circuit 610 shown in FIG. 6. For the filter 611, the filter 612, the mixer 613, the mixer 614, the switching circuit 615, the filter 616, the attenuator 617, the switching circuit 618, and the phase shift circuit 619 shown in FIG. 9, reference may be made to related description of FIG. 6, so the details are not repeated herein. Please refer to FIG. 2, FIG. 6, and FIG. 9. In the embodiment shown in FIG. 9, the filter 611, the filter 612, the mixer 613, the mixer 614, the switching circuit 615, the filter 616, the attenuator 617, the switching circuit 618, and the phase shift circuit 619 are arranged on the lower circuit board 121L. The local oscillation clock LOc is transmitted to the common terminal of the switching circuit 618 through the upper circuit board 121U and the flexible circuit 121F.

Figure 10:
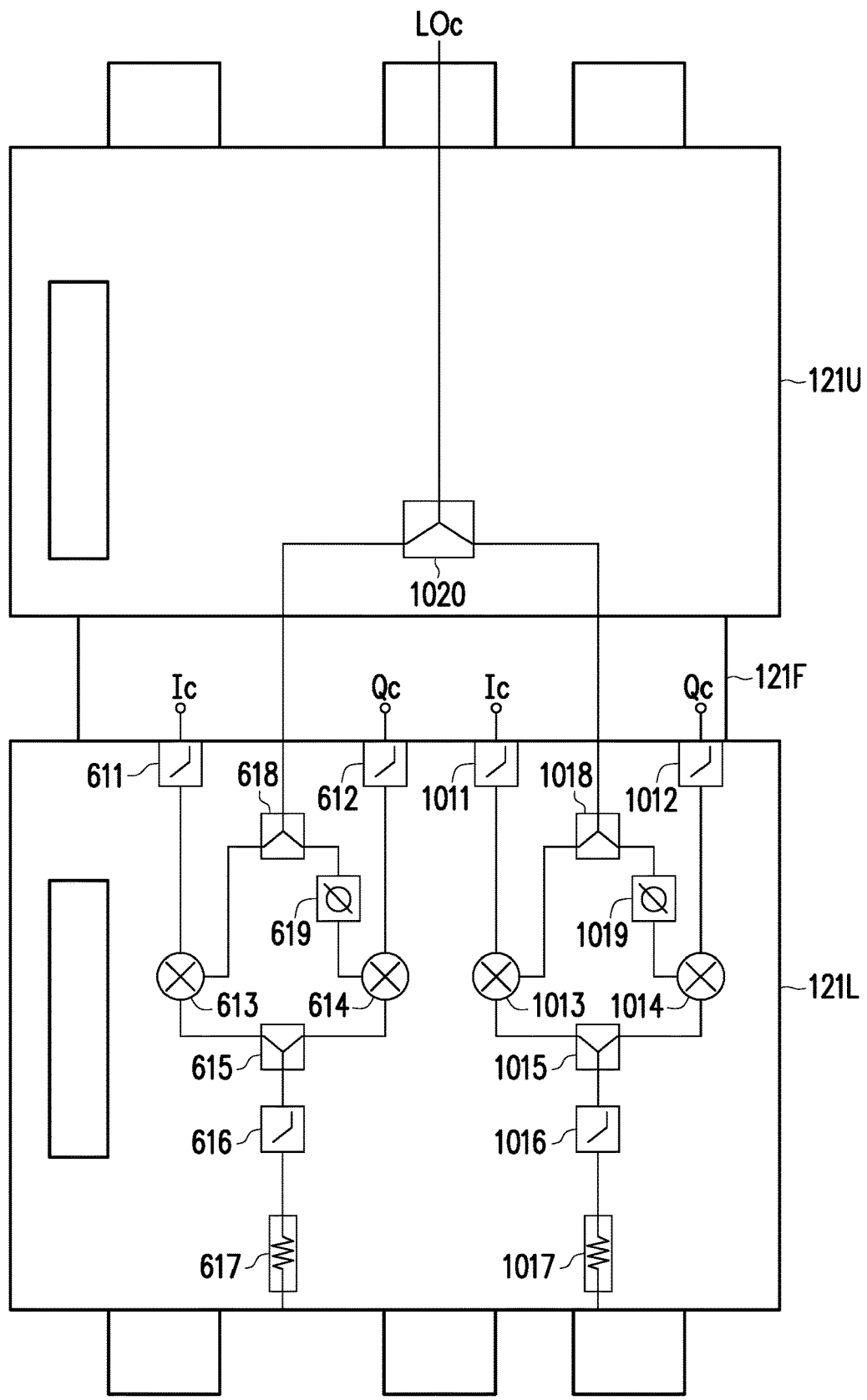
FIG. 10 is a schematic diagram of component placement on the upper circuit board and the lower circuit board according to another embodiment of the present disclosure.

FIG. 10 is a schematic diagram of component placement on the upper circuit board 121U and the lower circuit board 121L according to another embodiment of the present disclosure. FIG. 10 illustrates the control circuit 610 shown in FIG. 6. In the embodiment shown in FIG. 10, the filter 611, the filter 612, the mixer 613, the mixer 614, the switching circuit 615, the filter 616, the attenuator 617, the switching circuit 618, and the phase shift circuit 619 are arranged on the lower circuit board 121L. For the filter 611, the filter 612, the mixer 613, the mixer 614, the switching circuit 615, the filter 616, the attenuator 617, the switching circuit 618, and the phase shift circuit 619 shown in FIG. 10, reference may be made related description of FIG. 6, so the details are not repeated herein. In the embodiment shown in FIG. 10, the control circuit 610 further includes a switching circuit 1020, a filter 1011, a filter 1012, a mixer 1013, a mixer 1014, a switching circuit 1015, a filter 1016, an attenuator 1017, a switching circuit 1018, and a phase shift circuit 1019. The switching circuit 1020 is provided on the upper circuit board 121U. The common terminal of the switching circuit 1020 is disposed to receive the local oscillation clock LOc.

In the embodiment shown in FIG. 10, the filter 1011, the filter 1012, the mixer 1013, the mixer 1014, the switching circuit 1015, the filter 1016, the attenuator 1017, the switching circuit 1018, and the phase shift circuit 1019 are disposed on the lower circuit board 121L. Please refer to FIG. 2, FIG. 6 and FIG. 10. The common terminal of the switching circuit 618 is electrically coupled to the first selection terminal of the switching circuit 1020 through the flexible circuit 121F, and the common terminal of the switching circuit 1018 is electrically coupled to the second selection terminal of the switching circuit 1020 through the flexible circuit 121F. The input terminal of the filter 1011 is disposed to receive the I-phase control signal Ic. The input terminal of the filter 1012 is disposed to receive the Q-phase control signal Qc. The first input terminal of the mixer 1013 is coupled to the output terminal of the filter 1011. The first input terminal of the mixer 1014 is coupled to the output terminal of the filter 1012. The first selection terminal of the switching circuit 1018 is coupled to the second input terminal of the mixer 1013. The input terminal of the phase shift circuit 1019 is coupled to the second selection terminal of the switching circuit 1018. The output terminal of the phase shift circuit 1019 is coupled to the second input terminal of the mixer 1014. The first selection terminal of the switching circuit 1015 is coupled to the output terminal of the mixer 1013. The second selection terminal of the switching circuit 1015 is coupled to the output terminal of the mixer 1014. The input terminal of the filter 1016 is coupled to the common terminal of the switching circuit 1015. The input terminal of the attenuator 1017 is coupled to the output terminal of the filter 1016. The output terminal of the attenuator 1017 is coupled to the quantum bit portion 111 through the partition 101.

Figure 11:
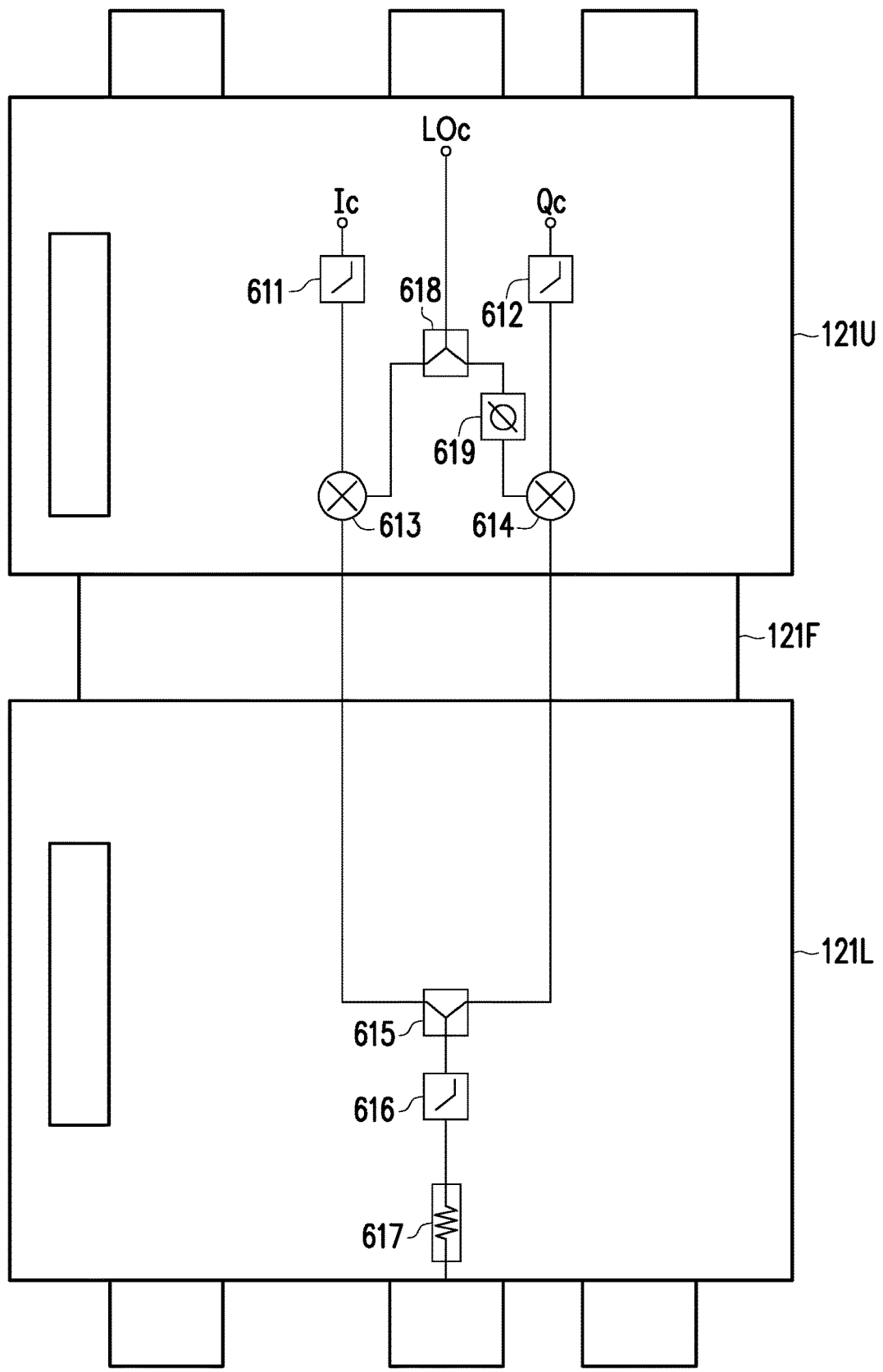
FIG. 11 is a schematic diagram of component placement on the upper circuit board and the lower circuit board according to still another embodiment of the present disclosure.

FIG. 11 is a schematic diagram of component placement on the upper circuit board 121U and the lower circuit board 121L according to still another embodiment of the present disclosure. FIG. 11 illustrates the control circuit 610 shown in FIG. 6. For the filter 611, the filter 612, the mixer 613, the mixer 614, the switching circuit 615, the filter 616, the attenuator 617, the switching circuit 618 and the phase shift circuit 619 shown in FIG. 11, reference may be made to related description of FIG. 6, so the details are not repeated herein. Please refer to FIG. 2, FIG. 6 and FIG. 11. In the embodiment shown in FIG. 11, the first filter 611, the filter 612, the mixer 613, the mixer 614, the switching circuit 618, and the phase shift circuit 619 are arranged on the upper circuit board 121U, and the switching circuit 615, the filter 616, and the attenuator 617 are disposed on the lower circuit board 121L. The first selection terminal of the switching circuit 615 is electrically coupled to the output terminal of the mixer 613 through the flexible circuit 121F, and the second selection terminal of the switching circuit 615 is electrically coupled to the output terminal of the mixer 614 through the flexible circuit 121F.

Figure 12:
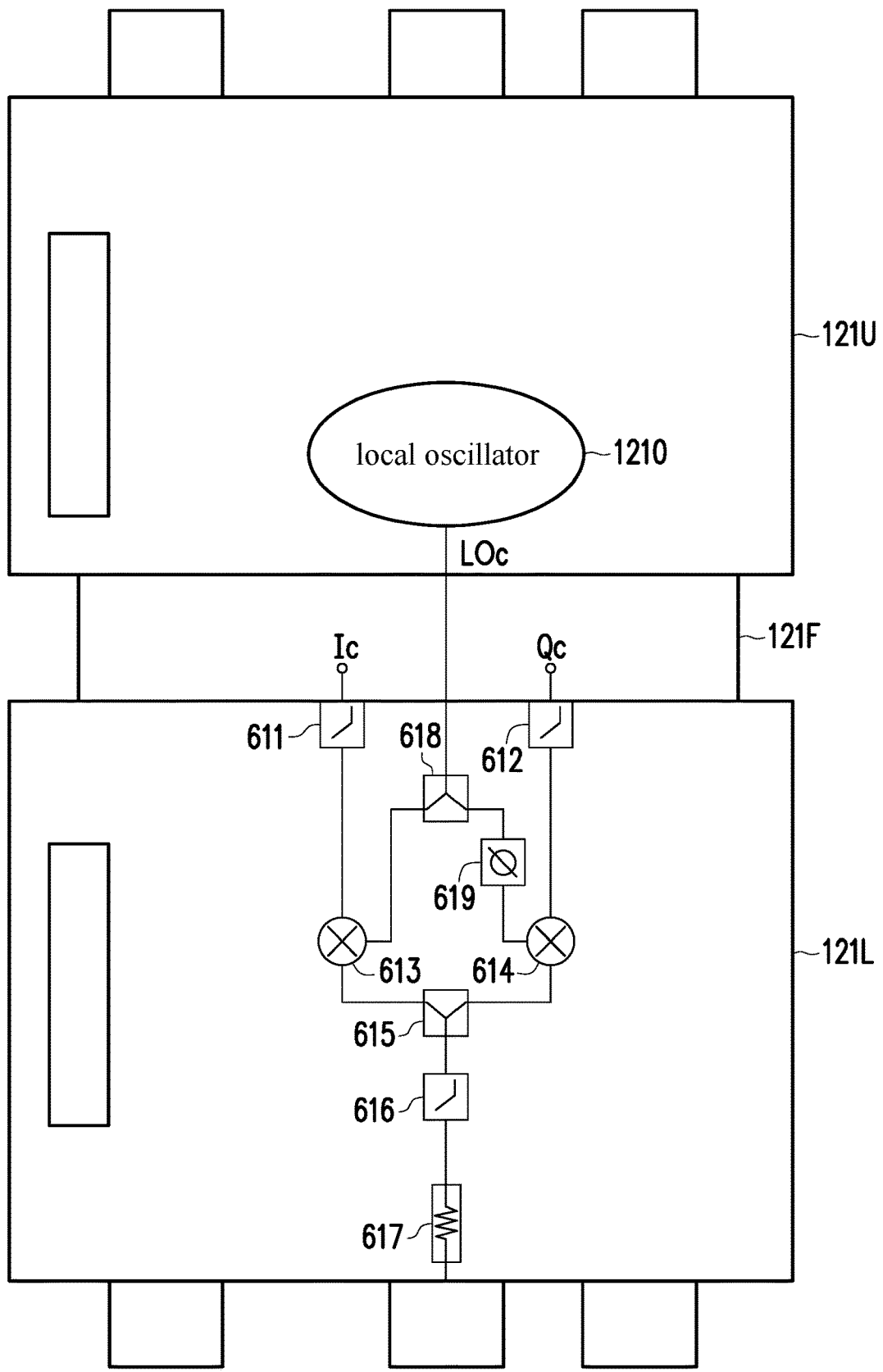
FIG. 12 is a schematic diagram of component placement on the upper circuit board and the lower circuit board according to yet another embodiment of the present disclosure.

FIG. 12 is a schematic diagram of component placement on the upper circuit board 121U and the lower circuit board 121L according to yet another embodiment of the present disclosure. FIG. 12 illustrates the control circuit 610 shown in FIG. 6. For the filter 611, the filter 612, the mixer 613, the mixer 614, the switching circuit 615, the filter 616, the attenuator 617, the switching circuit 618, and the phase shift circuit 619 shown in FIG. 12, reference may be made to related description of FIG. 6, so the details are not repeated herein. Please refer to FIG. 2, FIG. 6 and FIG. 12. In the embodiment shown in FIG. 12, the microwave device further includes a local oscillator 1210. The local oscillator 1210 is coupled to the control circuit 610 to provide the local oscillation clock LOc. The local oscillator 1210 is arranged on the upper circuit board 121U, and the filter 611, the filter 612, the mixer 613, the mixer 614, the switching circuit 615, the filter 616, the attenuator 617, the switching circuit 618, and the phase shift circuit 619 are disposed on the lower circuit board 121L. The local oscillator 1210 transmits the local oscillation clock LOc to the common terminal of the switching circuit 618 through the flexible circuit 121F.

Figure 13:
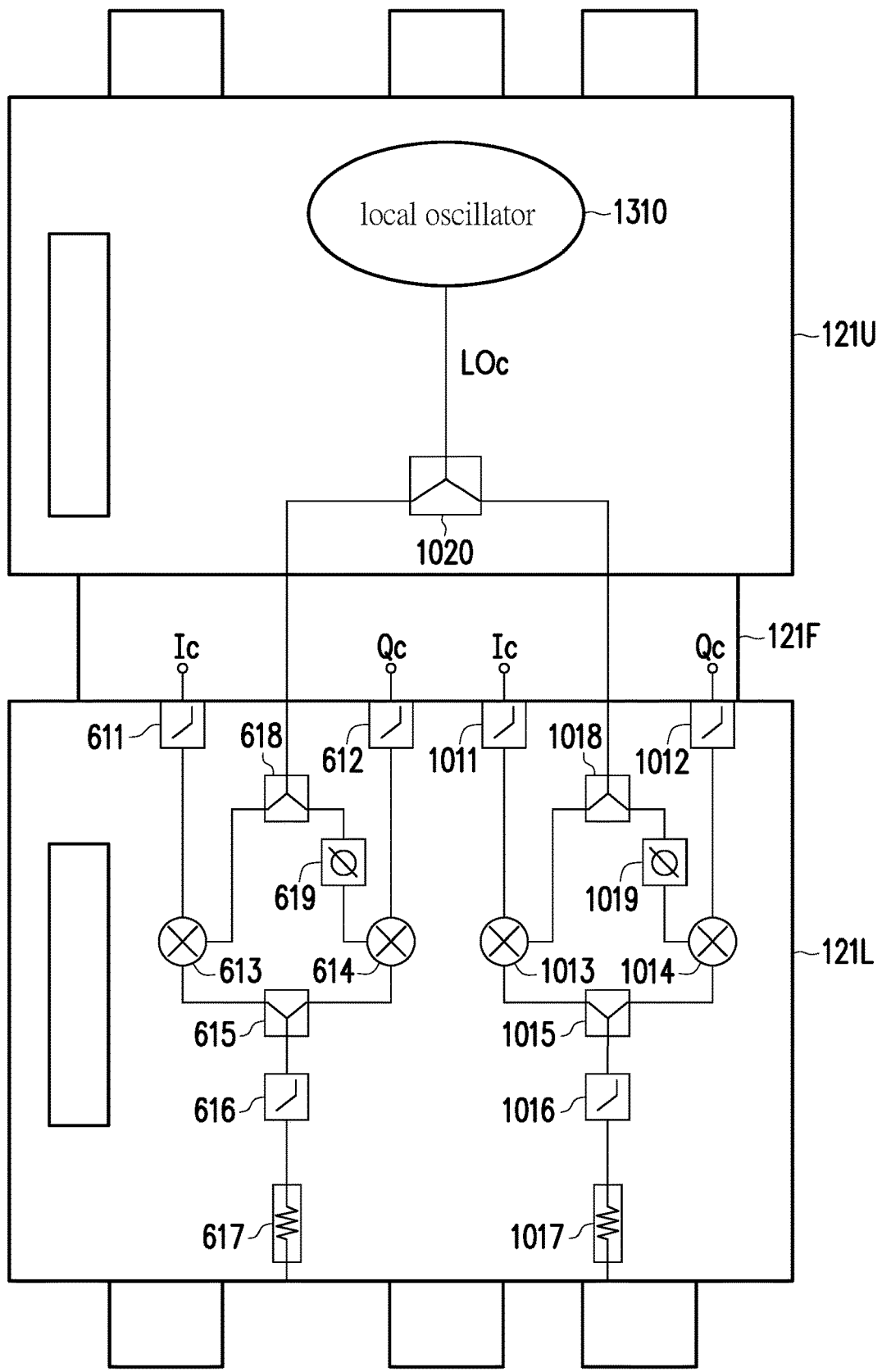
FIG. 13 is a schematic diagram of component placement on the upper circuit board and the lower circuit board according to still another embodiment of the present disclosure.

FIG. 13 is a schematic diagram of component placement on the upper circuit board 121U and the lower circuit board 121L according to still another embodiment of the present disclosure. FIG. 13 illustrates the control circuit 610 shown in FIG. 6. For the filter 611, the filter 612, the mixer 613, the mixer 614, the switching circuit 615, the filter 616, the attenuator 617, the switching circuit 618, the phase shift circuit 619, the switching circuit 1020, the filter 1011, the filter 1012, the mixer 1013, the mixer 1014, the switching circuit 1015, the filter 1016, the attenuator 1017, the switching circuit 1018, and phase shift circuit 1019 shown in FIG. 13, reference may be made to related description of FIG. 10, so the details are not repeated herein. In the embodiment shown in FIG. 13, the microwave device further includes a local oscillator 1310. The local oscillator 1310 is coupled to the control circuit 610 to provide the local oscillation clock LOc. The local oscillator 1310 is disposed on the upper circuit board 121U. The local oscillator 1310 transmits the local oscillation clock LOc to the common terminal of the switching circuit 1020.

Figure 14:
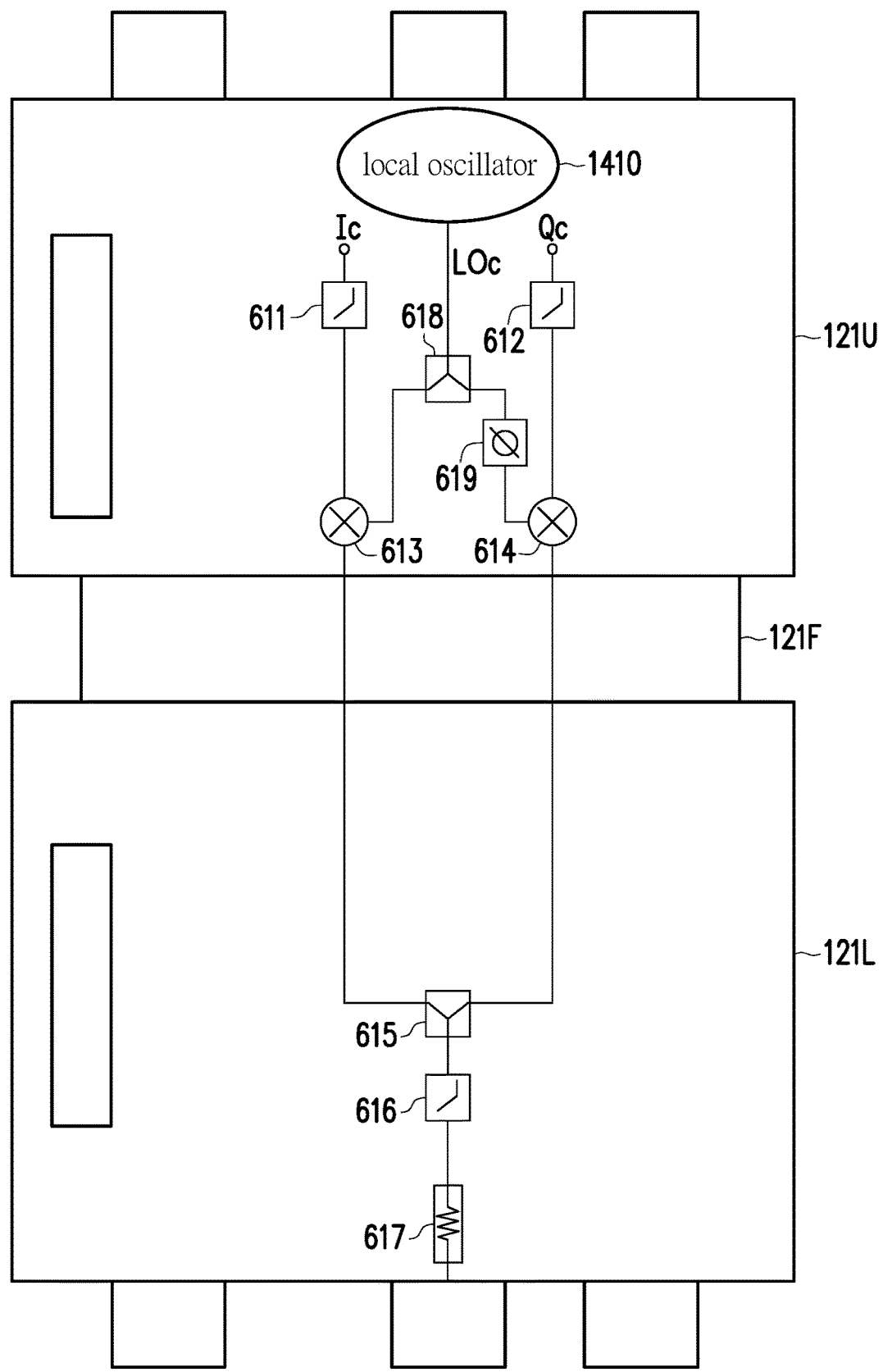
FIG. 14 is a schematic diagram of component placement on the upper circuit board and the lower circuit board according to yet another embodiment of the present disclosure.

FIG. 14 is a schematic diagram of component placement on the upper circuit board 121U and the lower circuit board 121L according to yet another embodiment of the present disclosure. FIG. 14 illustrates the control circuit 610 shown in FIG. 6. For the filter 611, the filter 612, the mixer 613, the mixer 614, the switching circuit 615, the filter 616, the attenuator 617, the switching circuit 618, and the phase shift circuit 619 shown in FIG. 14, reference may be made to related description of FIG. 11, so the details are not repeated herein. In the embodiment shown in FIG. 14, the microwave device further includes a local oscillator 1410. The local oscillator 1410 is coupled to the control circuit 610 to provide the local oscillation clock LOc. The local oscillator 1410 is disposed on the upper circuit board 121U. The local oscillator 1410 transmits the local oscillation clock LOc to the common terminal of the switching circuit 618.

Figure 15:
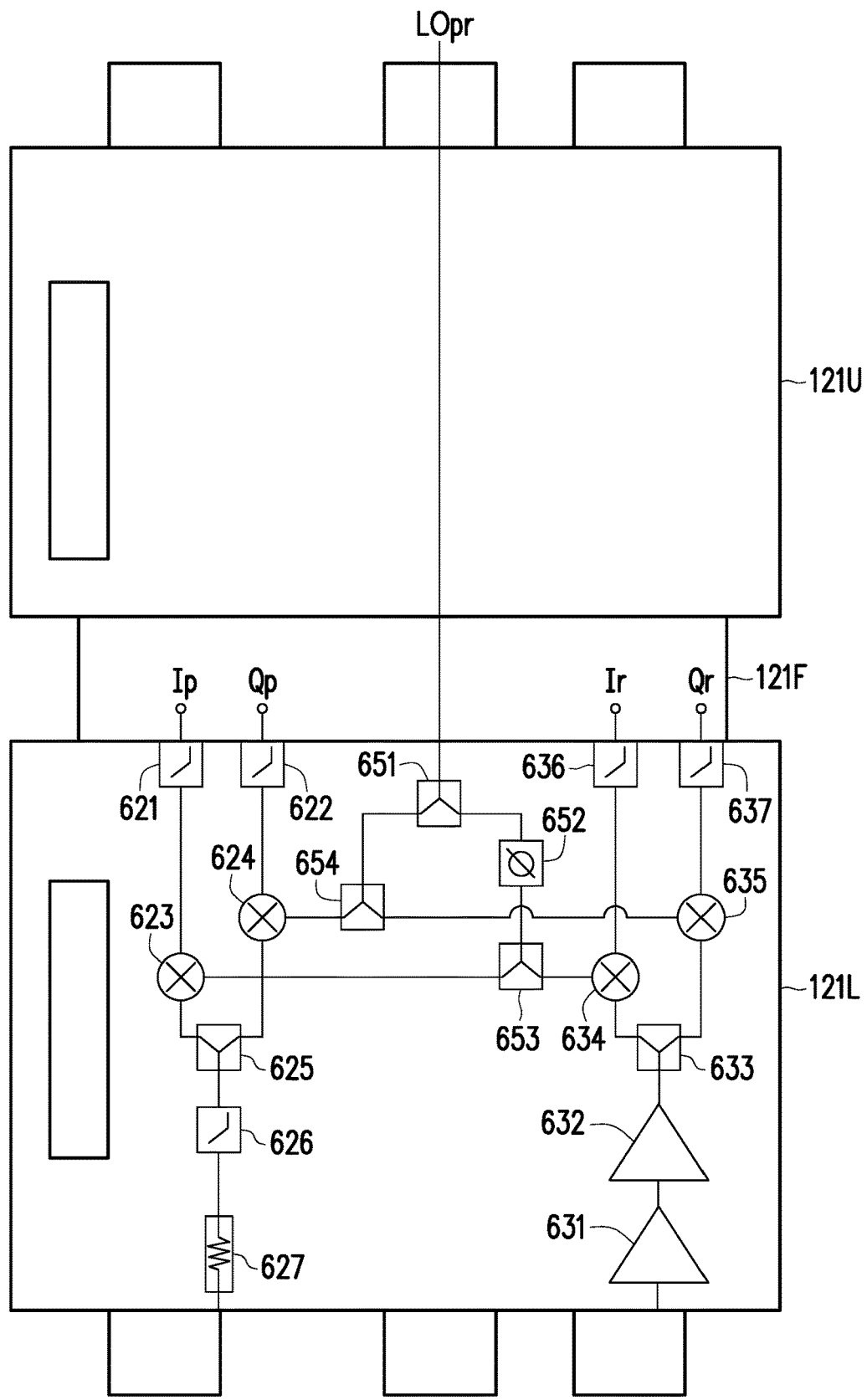
FIG. 15 is a schematic diagram of component placement on the upper circuit board and the lower circuit board according to an embodiment of the present disclosure.

FIG. 15 is a schematic diagram of component placement on the upper circuit board 121U and the lower circuit board 121L according to an embodiment of the present disclosure. FIG. 15 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 15, reference may made to relevant description of FIG. 6, so details are not repeated here. Please refer to FIG. 2, FIG. 6 and FIG. 15. In the embodiment shown in FIG. 15, the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 are disposed on the lower circuit board 121L. The local oscillation clock LOpr is transmitted to the common terminal of the switching circuit 651 through the upper circuit board 121U and the flexible circuit 121F.

Figure 16:
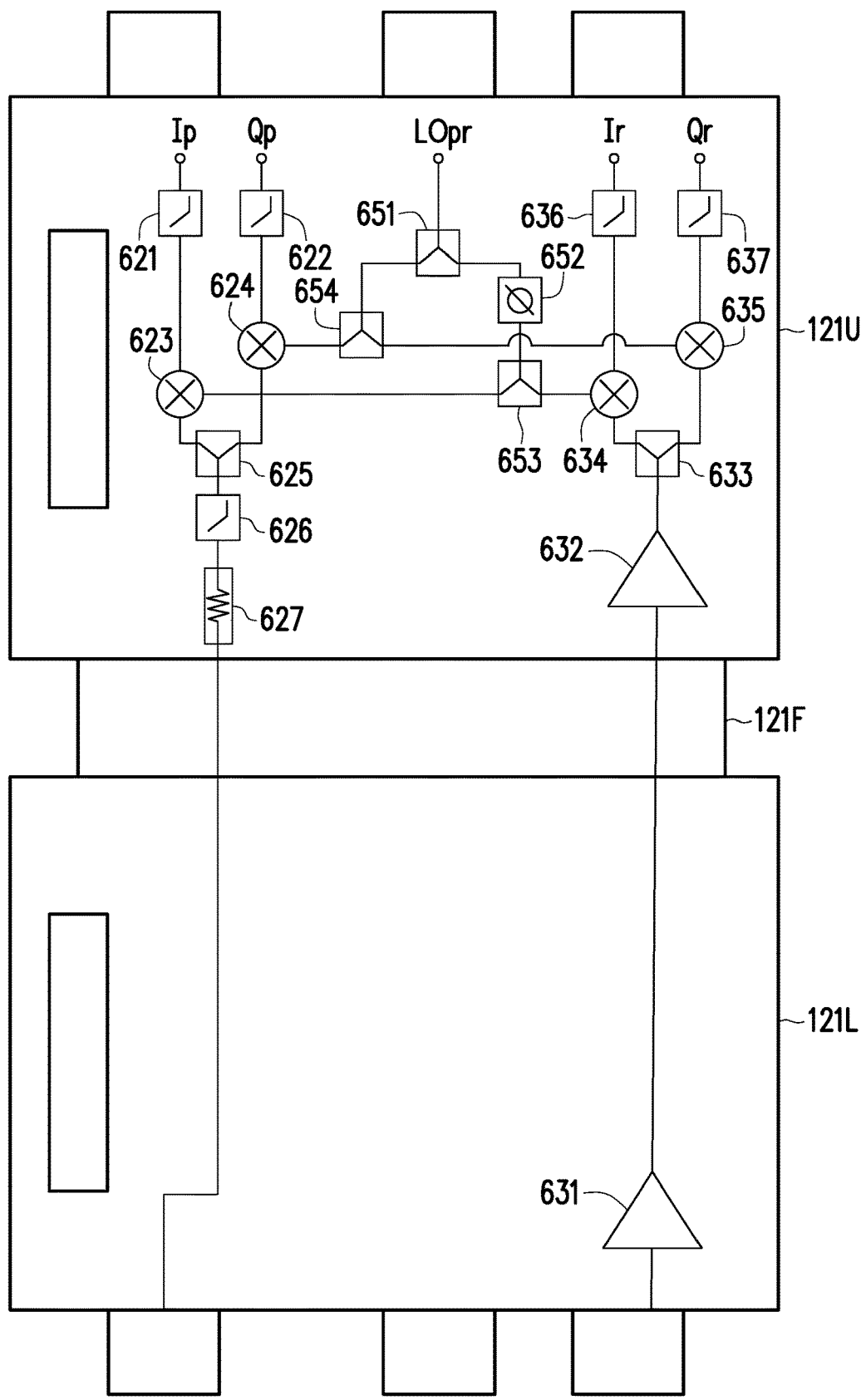
FIG. 16 is a schematic diagram of component placement on the upper circuit board and the lower circuit board according to another embodiment of the present disclosure.

FIG. 16 is a schematic diagram of component placement on the upper circuit board 121U and the lower circuit board 121L according to another embodiment of the present disclosure. FIG. 16 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 16, reference may be made to relevant description of FIG. 6, so details are not repeated here. Please refer to FIG. 2, FIG. 6 and FIG. 16. In the embodiment shown in FIG. 16, the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 632, the switching circuit 633, the mixer 634, the mixer 635, the filter 636, and the filter 637 are disposed on the upper circuit board 121U, while the amplifier 631 is disposed on the lower circuit board 121L. The output terminal of the amplifier 631 is electrically coupled to the input terminal of the amplifier 632 through the flexible circuit 121F.

Figure 17:
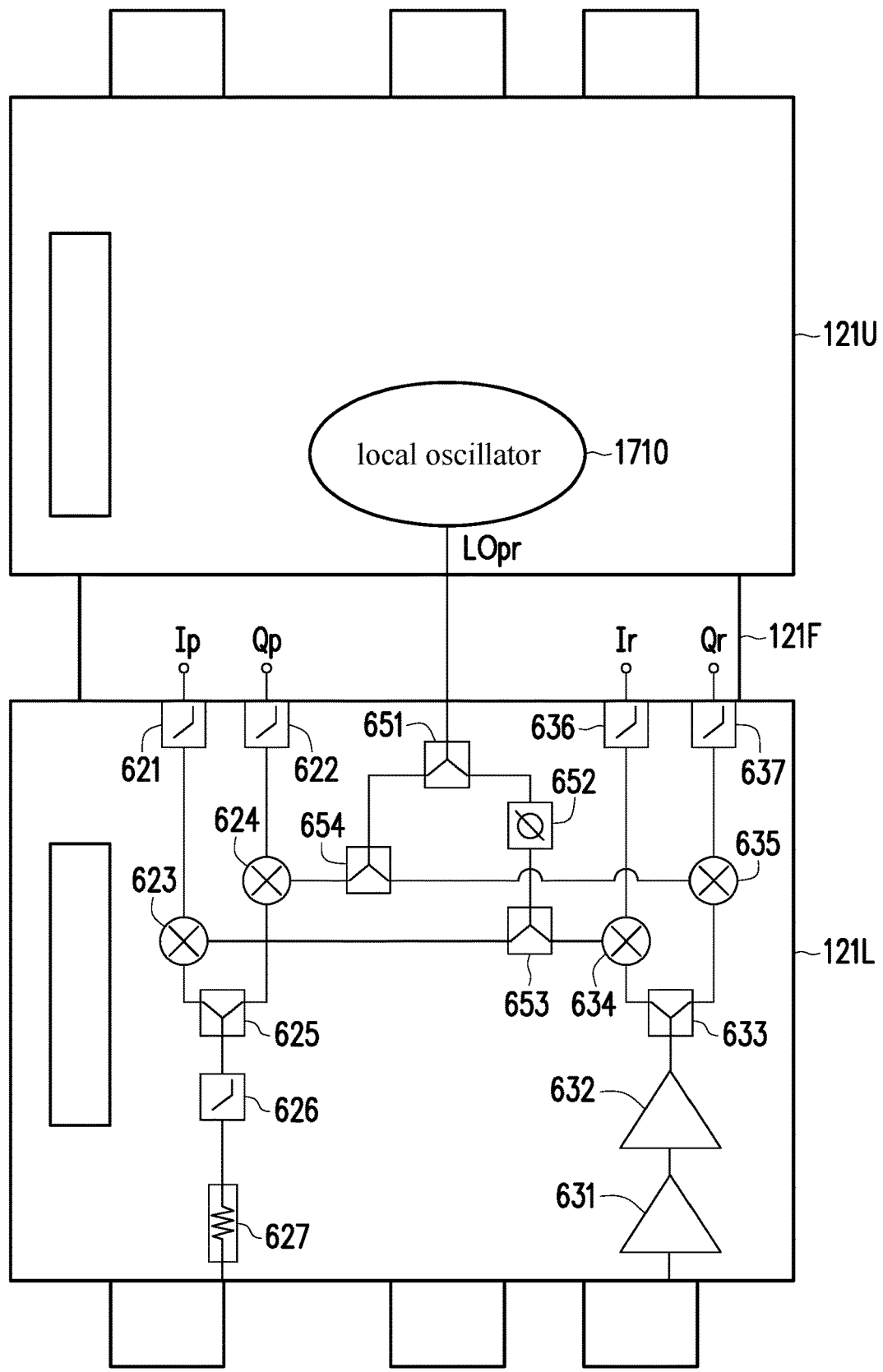
FIG. 17 is a schematic diagram of component placement on the upper circuit board and the lower circuit board according to yet another embodiment of the present disclosure.

FIG. 17 is a schematic diagram of component placement on the upper circuit board 121U and the lower circuit board 121L according to yet another embodiment of the present disclosure. FIG. 17 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 17, reference may be made to relevant description of FIG. 15, so details are not repeated here. In the embodiment shown in FIG. 17, the microwave device further includes a local oscillator 1710. The local oscillator 1710 is coupled to the common terminal of the switching circuit 651 through the flexible circuit 121F to provide the local oscillation clock LOpr.

Figure 18:
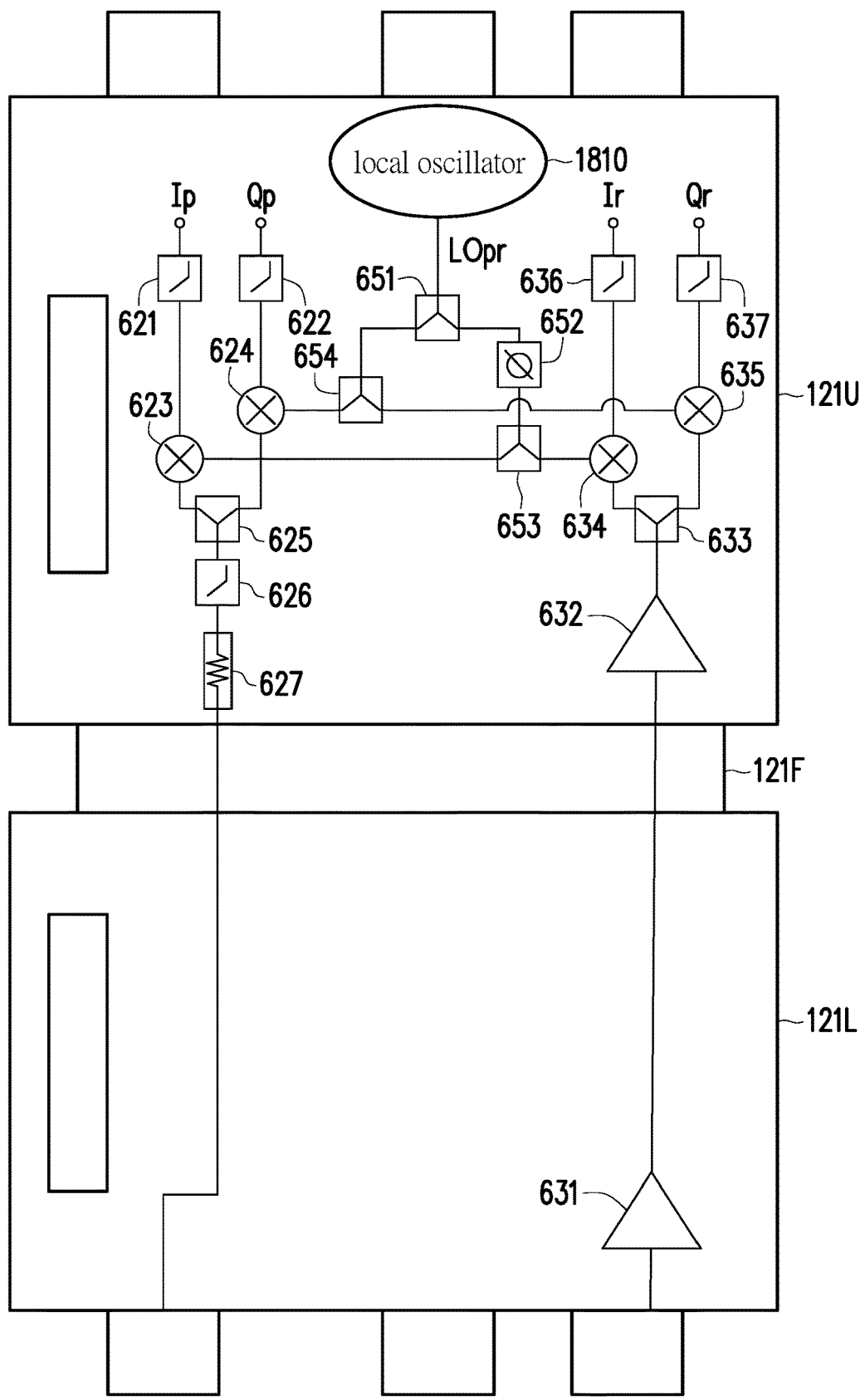
FIG. 18 is a schematic diagram of component placement on the upper circuit board and the lower circuit board according to still another embodiment of the present disclosure.

FIG. 18 is a schematic diagram of component placement on the upper circuit board 121U and the lower circuit board 121L according to still another embodiment of the present disclosure. FIG. 18 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 18, reference may be made to relevant description of FIG. 16, so details are not repeated here. In the embodiment shown in FIG. 18, the microwave device further includes a local oscillator 1810. The local oscillator 1810 is coupled to the common terminal of the switching circuit 651 to provide the local oscillation clock LOpr.

Figure 19:
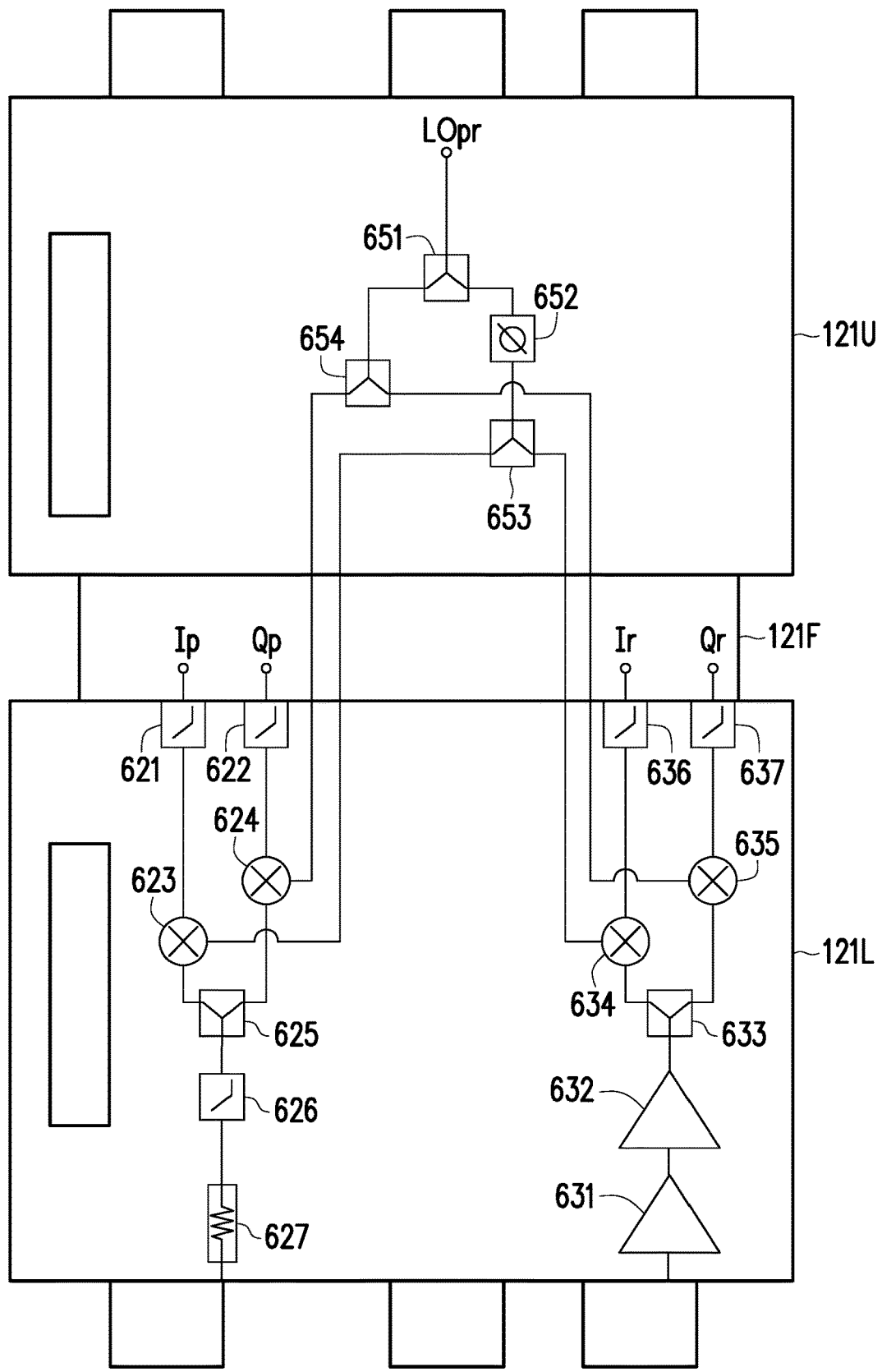
FIG. 19 is a schematic diagram of component placement on the upper circuit board and the lower circuit board according to yet another embodiment of the present disclosure.

FIG. 19 is a schematic diagram of component placement on the upper circuit board 121U and the lower circuit board 121L according to yet another embodiment of the present disclosure. FIG. 19 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 19, reference may be made to the relevant description of FIG. 6, so details are not repeated here. Please refer to FIG. 2, FIG. 6, and FIG. 19. In the embodiment shown in FIG. 19, the switching circuit 651, the phase shift circuit 652, the switching circuit 653, and the switching circuit 654 are disposed on the upper circuit board 121U, and the filter 621, the filter 622, the mixer 623, the mixer 624, the switching circuit 625, the filter 626, the attenuator 627, the amplifier 631, the amplifier 632, the switching circuit 633, the mixer 634, the mixer 635, the filter 636, and the filter 637 are disposed on the lower circuit board 121L. The second input terminal of the mixer 623 is electrically coupled to the first selection terminal of the switching circuit 653 through the flexible circuit 121F to receive the first oscillation clock. The second input terminal of the mixer 624 is electrically coupled to the first selection terminal of the switching circuit 654 through the flexible circuit 121F to receive the second oscillation clock. The second input terminal of the mixer 634 is electrically coupled to the second selection terminal of the switching circuit 653 through the flexible circuit 121F to receive the third oscillation clock. The second input terminal of the mixer 635 is electrically coupled to the second selection terminal of the switching circuit 654 through the flexible circuit 121F to receive the fourth oscillation clock.

Figure 20:
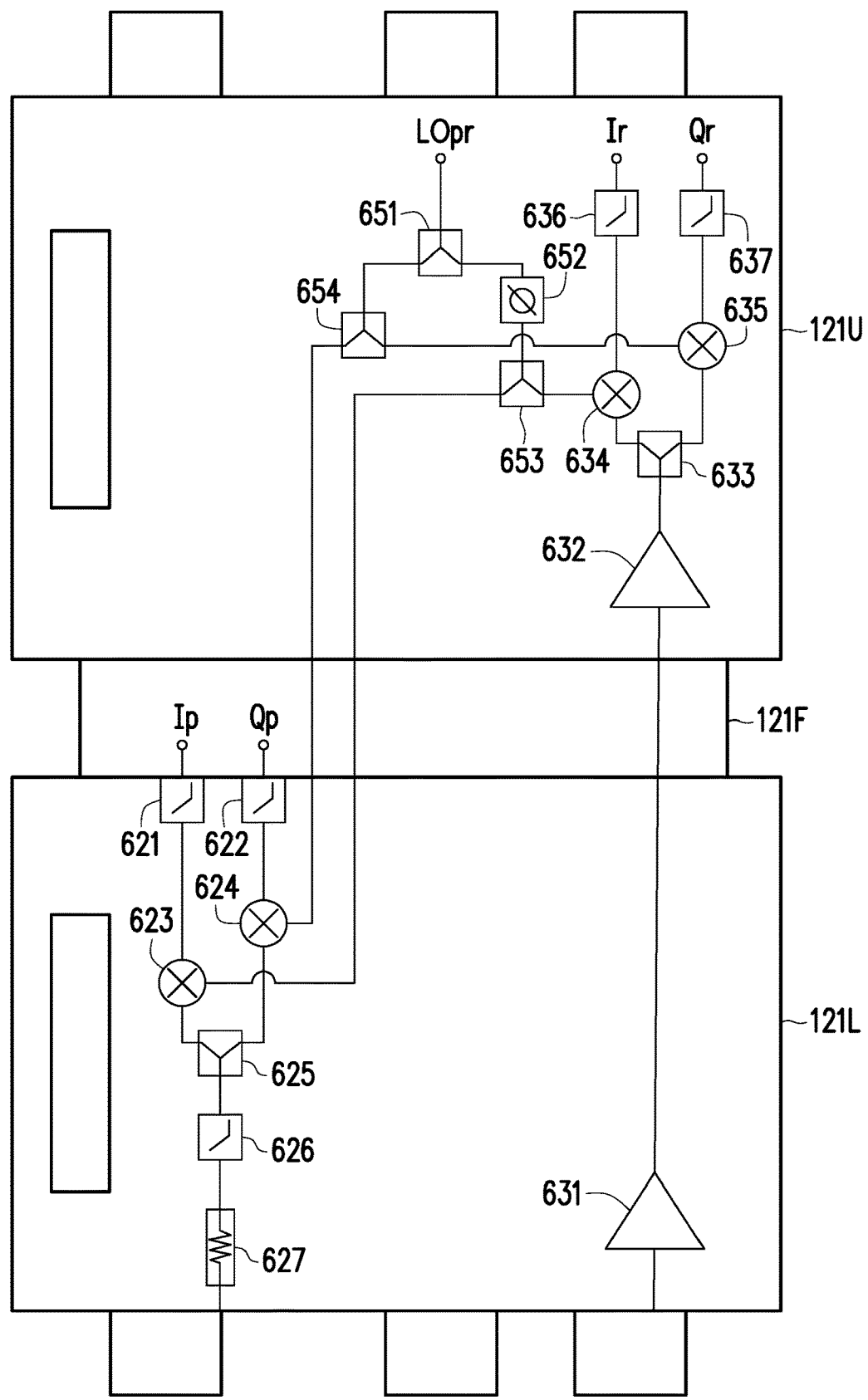
FIG. 20 is a schematic diagram of component placement on the upper circuit board and the lower circuit board according to still another embodiment of the present disclosure.

FIG. 20 is a schematic diagram of component placement on the upper circuit board 121U and the lower circuit board 121L according to still another embodiment of the present disclosure. FIG. 20 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 20, reference may be made to the relevant description of FIG. 6, so details are not repeated here. Please refer to FIG. 2, FIG. 6 and FIG. 20. In the embodiment shown in FIG. 20, the switching circuit 651, the phase shift circuit 652, the switching circuit 653, the switching circuit 654, the amplifier 632, the switching circuit 633, the mixer 634, the mixer 635, the filter 636, and the filter 637 are disposed on the upper circuit board 121U, and the filter 621, the filter 622, the mixer 623, the mixer 624, the switching circuit 625, the filter 626, the attenuator 627, and the amplifier 631 are disposed on the lower circuit board 121L. The second input terminal of the mixer 623 is electrically coupled to the first selection terminal of the switching circuit 653 through the flexible circuit 121F to receive the first oscillation clock. The second input terminal of the mixer 624 is electrically coupled to the first selection terminal of the switching circuit 654 through the flexible circuit 121F to receive the second oscillation clock. The output terminal of the amplifier 631 is electrically coupled to the input terminal of the amplifier 632 through the flexible circuit 121F.

Figure 21:
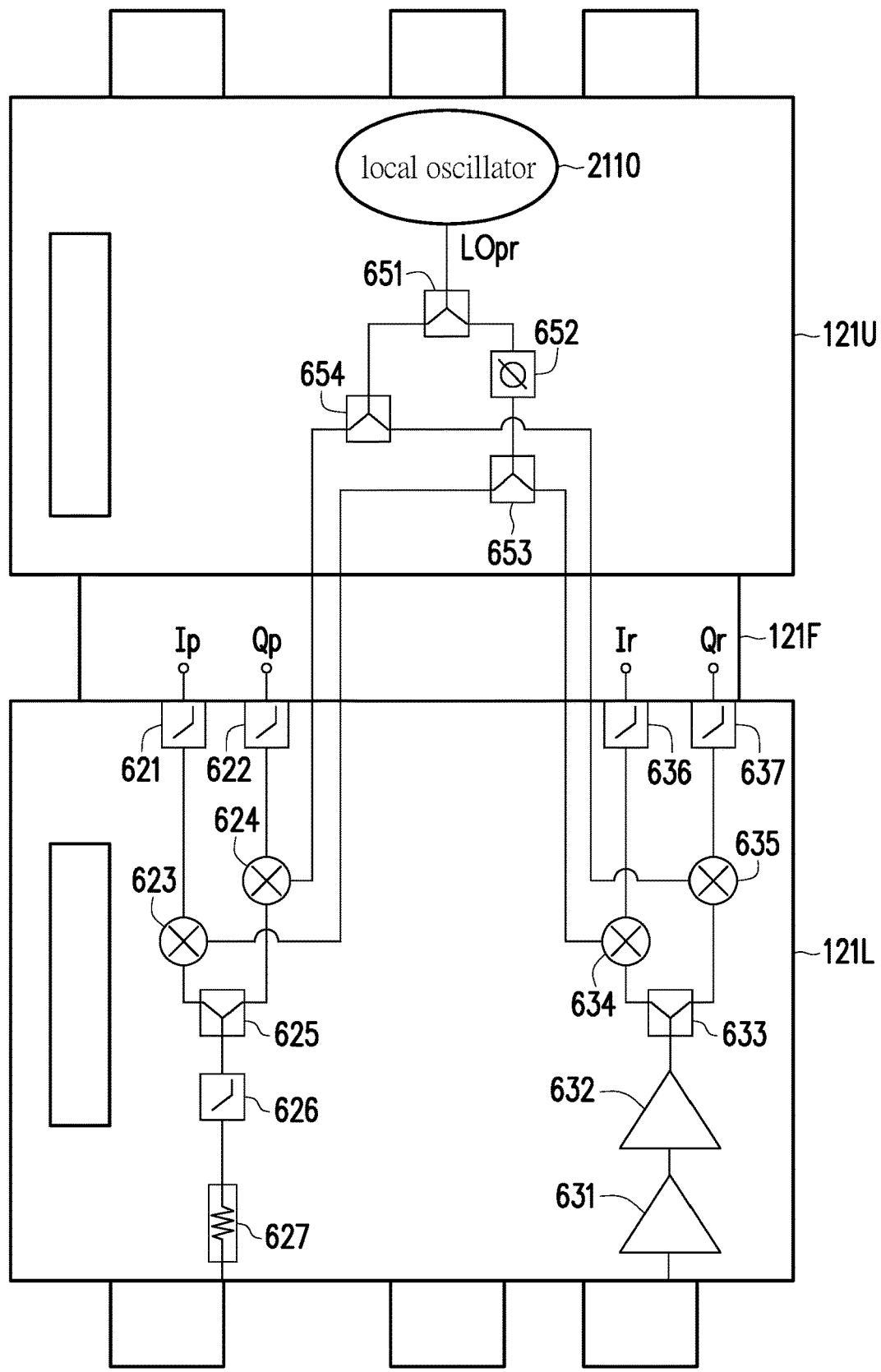
FIG. 21 is a schematic diagram of component placement on the upper circuit board and the lower circuit board according to yet another embodiment of the present disclosure.

FIG. 21 is a schematic diagram of component placement on the upper circuit board 121U and the lower circuit board 121L according to another embodiment of the present disclosure. FIG. 21 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 21, reference may be made to the relevant description of FIG. 19, so details are not repeated here. In the embodiment shown in FIG. 21, the microwave device further includes a local oscillator 2110. The local oscillator 2110 is coupled to the common terminal of the switching circuit 651 to provide the local oscillation clock LOpr.

Figure 22:
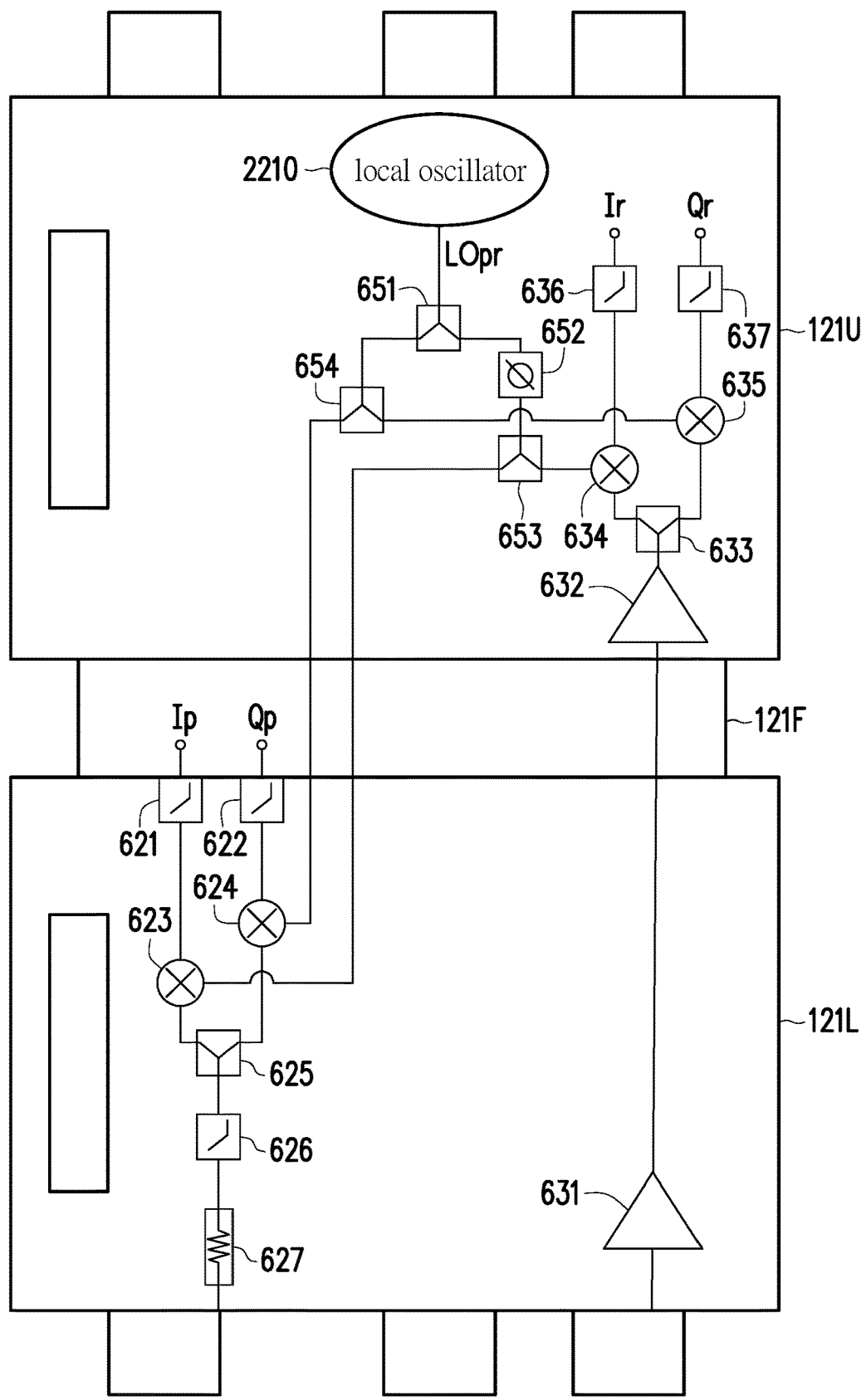
FIG. 22 is a schematic diagram of component placement on the upper circuit board and the lower circuit board according to still another embodiment of the present disclosure.

FIG. 22 is a schematic diagram of component placement on the upper circuit board 121U and the lower circuit board 121L according to yet another embodiment of the present disclosure. FIG. 22 illustrates the write circuit 620 and the read circuit 630 shown in FIG. 6. For the filter 621, the filter 622, the mixer 623, the mixer 624, the switching circuit 625, the filter 626, the attenuator 627, the switching circuit 651, the phase shift circuit 652, the switching circuit 653, the switching circuit 654, the amplifier 631, the amplifier 632, the switching circuit 633, the mixer 634, the mixer 635, the filter 636, and the filter 637 shown in FIG. 22, reference may be made to the relevant description of FIG. 20, so details are not repeated here. In the embodiment shown in FIG. 22, the microwave device further includes a local oscillator 2210. The local oscillator 2210 is coupled to the common terminal of the switching circuit 651 to provide the local oscillation clock LOpr.

To sum up, the above-mentioned embodiments divide the circuit board used to realize the microwave device into two pieces (the upper circuit board 121U and the lower circuit board 121L). The upper circuit board 121U and the lower circuit board 121L are electrically connected to each other through a flexible circuit 121F (such as a flex cable, a flexible printed circuit board or other flexible electrical paths). Therefore, in the process of reducing temperature significantly, the flexible circuit 121F may provide a deformation and buffering effect when the upper circuit board 121U and the lower circuit board 121L are shrunk, so as to prevent the connection from breaking and being damaged.

Although the disclosure has been disclosed as the above embodiments, they are not intended to limit the disclosure. Any person with ordinary knowledge in the field can make changes and modifications without departing from the spirit and scope of the disclosure. Therefore, the scope of the disclosure is defined by the appended claims.

What is claimed is:

1. A quantum device, comprising:
a first partition;
a second partition, disposed below the first partition, wherein the first partition and the second partition are configured to define a first ultra-low temperature chamber of the quantum device;
a first upper circuit board, disposed in the first ultra-low temperature chamber, wherein the first upper circuit board is disposed on a lower surface of the first partition;
a first lower circuit board, disposed in the first ultra-low temperature chamber, wherein the first lower circuit board is disposed on an upper surface of the second partition; and
a first flexible circuit, disposed in the first ultra-low temperature chamber, wherein the first flexible circuit is electrically connected between the first upper circuit board and the first lower circuit board to provide a plurality of signal paths for mutual signal transmission between the first upper circuit board and the first lower circuit board.

2. The quantum device according to claim 1, wherein a first edge portion of the first upper circuit board is locked on the lower surface of the first partition, a first edge portion of the first lower circuit board is locked on the upper surface of the second partition, a first edge portion of the first flexible circuit is electrically connected to a second edge portion of the first upper circuit board, and a second edge portion of the first flexible circuit is electrically connected to a second edge portion of the first lower circuit board.

3. The quantum device according to claim 2, wherein the first flexible circuit is a flexible cable or a flexible printed circuit board, the first upper circuit board is a rigid printed circuit board, and the first lower circuit board is another rigid printed circuit board.

4. The quantum device according to claim 1, wherein a first edge portion of the first upper circuit board is locked on the lower surface of the first partition, a first edge portion of the first lower circuit board is locked on the upper surface of the second partition, a first edge portion of the first flexible circuit is embedded between a first layer and a second layer of the first upper circuit board, and a second edge portion of the first flexible circuit is embedded between a first layer and a second layer of the first lower circuit board.

5. The quantum device according to claim 4, wherein the first flexible circuit is a flexible printed circuit board, the first upper circuit board is a rigid printed circuit board, and the first lower circuit board is another rigid printed circuit board.

6. The quantum device according to claim 1, further comprising:
a third partition, disposed above the first partition, wherein the first partition and the third partition are disposed to define a second ultra-low temperature chamber of the quantum device;
a second upper circuit board, disposed in the second ultra-low temperature chamber, wherein the second upper circuit board is locked on a lower surface of the third partition;
a second lower circuit board, disposed in the second ultra-low temperature chamber, wherein the second lower circuit board is locked on an upper surface of the first partition; and
a second flexible circuit, disposed in the second ultra-low temperature chamber, wherein the second flexible circuit is electrically connected between the second upper circuit board and the second lower circuit board to provide a plurality of signal paths for mutual signal transmission between the second upper circuit board and the second lower circuit board.

7. The quantum device according to claim 1, wherein a second ultra-low temperature chamber of the quantum device is located under the second partition, and the quantum device further comprising:
a microwave device, disposed on the first upper circuit board and the first lower circuit board, wherein the microwave device accesses a quantum bit portion disposed in the second ultra-low temperature chamber through the second partition.

8. The quantum device according to claim 7, wherein the microwave device comprises:
a control circuit, configured to control the quantum bit portion;
a write circuit, configured to write a data into the quantum bit portion; and
a read circuit, configured to read the quantum bit portion.

9. The quantum device according to claim 8, wherein the microwave device further comprises:
a local oscillator, coupled to the control circuit to provide a local oscillation clock, wherein the local oscillator is disposed on the first upper circuit board.

10. The quantum device according to claim 8, where the control circuit comprises:
a first filter, having an input terminal for receiving an I-phase control signal;
a second filter, having an input terminal for receiving a Q-phase control signal;
a first mixer, having a first input terminal coupled to an output terminal of the first filter, wherein a second input terminal of the first mixer receives a first oscillation clock;
a second mixer, having a first input terminal coupled to an output terminal of the second filter, wherein a second input terminal of the second mixer receives a second oscillation clock;
a first switching circuit, having a first selection terminal coupled to an output terminal of the first mixer, wherein a second selection terminal of the first switching circuit is coupled to an output terminal of the second mixer;
a third filter, having an input terminal coupled to a common terminal of the first switching circuit; and
a first attenuator, having an input terminal coupled to an output terminal of the third filter, wherein an output terminal of the first attenuator is coupled to the quantum bit portion through the second partition.

11. The quantum device according to claim 10, wherein the first filter, the first mixer, the second filter, the second mixer, the first switching circuit, the third filter, and the first attenuator are disposed on the first lower circuit board.

12. The quantum device according to claim 10, wherein the first filter, the first mixer, the second filter, and the second mixer are disposed on the first upper circuit board, and the first switching circuit, the third filter, and the first attenuator are disposed on the first lower circuit board.

13. The quantum device according to claim 10, wherein the control circuit further comprises:
a second switching circuit, having a common terminal for receiving a local oscillation clock, wherein a first selection terminal of the second switching circuit is coupled to the second input terminal of the first mixer to provide the first oscillation clock; and a phase shift circuit, having an input terminal coupled to a second selection terminal of the second switching circuit, wherein an output terminal of the phase shift circuit is coupled to the second input terminal of the second mixer to provide the second oscillation clock.

14. The quantum device according to claim 10, wherein the control circuit further comprises:

a second switching circuit, having a common terminal for receiving a local oscillation clock;

a third switching circuit, having a common terminal coupled to a first selection terminal of the second switching circuit, wherein a first selection terminal of the third switching circuit is coupled to the second input terminal of the first mixer to provide the first oscillation clock;

a first phase shift circuit, having an input terminal coupled to a second selection terminal of the third switching circuit, wherein an output terminal of the first phase shift circuit is coupled to the second input terminal of the second mixer to provide the second oscillation clock;

a fourth filter, having an input terminal for receiving the I-phase control signal;

a third mixer, having a first input terminal coupled to an output terminal of the fourth filter;

a fifth filter, having an input terminal for receiving the Q-phase control signal;

a fourth mixer, having a first input terminal coupled to an output terminal of the fifth filter;

a fourth switching circuit, having a common terminal coupled to a second selection terminal of the second switching circuit, wherein a first selection terminal of the fourth switching circuit is coupled to a second input terminal of the third mixer;

a second phase shift circuit, having an input terminal coupled to a second selection terminal of the fourth switching circuit, wherein an output terminal of the second phase shift circuit is coupled to a second input terminal of the fourth mixer;

a fifth switching circuit, having a first selection terminal coupled to an output terminal of the third mixer, wherein a second selection terminal of the fifth switching circuit is coupled to an output terminal of the fourth mixer;

a sixth filter, having an input terminal coupled to a common terminal of the fifth switching circuit; and a second attenuator, having an input terminal coupled to an output terminal of the sixth filter, wherein an output terminal of the second attenuator is coupled to the quantum bit portion through the second partition.

15. The quantum device according to claim 14, wherein the second switching circuit is disposed on the first upper circuit board, and the first filter, the first mixer, the second filter, the second mixer, the first switching circuit, the third filter, the first attenuator, the third switching circuit, the first phase shift circuit, the fourth filter, the third mixer, the fifth filter, the fourth mixer, the fourth switching circuit, the second phase shift circuit, the fifth switching circuit, the sixth filter, and the second attenuator are disposed on the first lower circuit board.

16. The quantum device according to claim 8, wherein the control circuit comprises:

a first filter, having an input terminal for receiving an I-phase control signal;

a second filter, having an input terminal for receiving a Q-phase control signal;

a third filter, having an input terminal for receiving a local oscillation clock;

a mixer, coupled to an output terminal of the first filter, an output terminal of the second filter, and an output terminal of the third filter; and a fourth filter, having an input terminal coupled to an output terminal of the mixer, wherein an output terminal of the fourth filter is coupled to the quantum bit portion through the second partition.

17. The quantum device according to claim 8, wherein the write circuit comprises:

a first filter, having an input terminal for receiving an I-phase data;

a second filter, having an input terminal for receiving a Q-phase data;

a first mixer, having a first input terminal coupled to an output terminal of the first filter, wherein a second input terminal of the first mixer receives a first oscillation clock;

a second mixer, having a first input terminal coupled to an output terminal of the second filter, wherein a second input terminal of the second mixer receives a second oscillation clock;

a switching circuit, having a first selection terminal coupled to an output terminal of the first mixer, wherein a second selection terminal of the switching circuit is coupled to an output terminal of the second mixer;

a third filter, having an input terminal coupled to a common terminal of the switching circuit; and an attenuator, having an input terminal coupled to an output terminal of the third filter, wherein an output terminal of the attenuator is coupled to the quantum bit portion through the second partition.

18. The quantum device according to claim 17, wherein the first filter, the second filter, the first mixer, the second mixer, the switching circuit, the third filter, and the attenuator are disposed on the first lower circuit board.

19. The quantum device according to claim 17, wherein the first filter, the second filter, the first mixer, the second mixer, the switching circuit, the third filter, and the attenuator are disposed on the first upper circuit board.

20. The quantum device according to claim 8, wherein the read circuit comprises:

a first amplifier, having an input terminal coupled to the quantum bit portion through the second partition;

a second amplifier, having an input terminal coupled to an output terminal of the first amplifier;

a switching circuit, having a common terminal coupled to an output terminal of the second amplifier;

a first mixer, having a first input terminal coupled to a first selection terminal of the switching circuit, wherein a second input terminal of the first mixer receives a first oscillation clock;

a second mixer, having a first input terminal coupled to a second selection terminal of the switching circuit, wherein a second input terminal of the second mixer receives a second oscillation clock;

a first filter, having an input terminal coupled to an output terminal of the first mixer; and a second filter, having an input terminal coupled to an output terminal of the second mixer.

21. The quantum device according to claim 20, wherein the first amplifier, the second amplifier, the switching circuit, the first mixer, the second mixer, the first filter, and the second filter are disposed on the first lower circuit board.

22. The quantum device according to claim 20, wherein the second amplifier, the switching circuit, the first mixer, the second mixer, the first filter, and the second filter are disposed on the first upper circuit board, and the first amplifier is disposed on the first lower circuit board.

23. The quantum device according to claim 8, wherein the microwave device further comprises:
   a first switching circuit, having a common terminal for receiving a local oscillation clock;
   a phase shift circuit, having an input terminal coupled to a first selection terminal of the first switching circuit; and
   a second switching circuit, having a common terminal coupled to an output terminal of the phase shift circuit;
   a third switching circuit, having a common terminal coupled to a second selection terminal of the first switching circuit,
   wherein a first selection terminal of the second switching circuit is coupled to the write circuit to provide a first oscillation clock, a first selection terminal of the third switching circuit is coupled to the write circuit to provide a second oscillation clock, a second selection terminal of the second switching circuit is coupled to the read circuit to provide a third oscillation clock, and a second selection terminal of the third switching circuit is coupled to the read circuit to provide a fourth oscillation clock.

24. The quantum device according to claim 23, wherein the first switching circuit, the second switching circuit, the phase shift circuit, and the third switching circuit are disposed on the first lower circuit board.

25. The quantum device according to claim 23, wherein the first switching circuit, the second switching circuit, the phase shift circuit, and the third switching circuit are disposed on the first upper circuit board.

26. The quantum device according to claim 23, wherein the microwave device further comprises:
   a local oscillator, coupled to the first switching circuit to provide the local oscillation clock, wherein the local oscillator is disposed on the first upper circuit board.

27. The quantum device according to claim 8, wherein the write circuit comprises:
   a first filter, having an input terminal for receiving an I-phase data;
   a second filter, having an input terminal for receiving a Q-phase data;
   a mixer, having a first input terminal coupled to an output terminal of the first filter, wherein a second input terminal of the mixer is coupled to an output terminal of the second filter, and a third input terminal of the mixer receives an oscillation clock; and
   a third filter, having an input terminal coupled to an output terminal of the mixer, wherein an output terminal of the third filter is coupled to the quantum bit portion through the second partition.

28. The quantum device according to claim 8, wherein the read circuit comprises:
   a first amplifier, having an input terminal coupled to the quantum bit portion through the second partition;
   a second amplifier, having an input terminal coupled to an output terminal of the first amplifier;
   a first filter, having an input terminal coupled to an output terminal of the second amplifier;
   a mixer, having a first input terminal coupled to an output terminal of the first filter, wherein a second input terminal of the mixer receives an oscillation clock;
   a second filter, having an input terminal coupled to a first output terminal of the mixer; and
   a third filter, having an input terminal coupled to a second output terminal of the mixer.

29. The quantum device according to claim 8, wherein the microwave device further comprises:
   a filter, having an input terminal for receiving a local oscillation clock; and
   a switching circuit, having a common terminal coupled to an output terminal of the filter, wherein a first selection terminal of the switching circuit is coupled to the write circuit to provide a first oscillation clock, and a second selection terminal of the switching circuit is coupled to the read circuit to provide a second oscillation clock.

* * * * *